United States Patent
Takakura et al.

(10) Patent No.: US 6,873,731 B2
(45) Date of Patent: Mar. 29, 2005

(54) IMAGE PROCESSING METHOD AND IMAGE PROCESSING DEVICE

(75) Inventors: Hiroyuki Takakura, Isehara (JP); Nobuyasu Yamaguchi, Machida (JP); Kenichiro Sakai, Sagamihara (JP); Hirotaka Chiba, Atsugi (JP); Tsugio Noda, Hadano (JP)

(73) Assignee: Fujitsu Limited, Kawasaki (JP)

( * ) Notice: Subject to any disclaimer, the term of this patent is extended or adjusted under 35 U.S.C. 154(b) by 607 days.

(21) Appl. No.: 09/777,870

(22) Filed: Feb. 7, 2001

(65) Prior Publication Data

US 2001/0028737 A1 Oct. 11, 2001

(30) Foreign Application Priority Data

Feb. 9, 2000 (JP) ........................................ 2000-031869
Aug. 29, 2000 (JP) ........................................ 2000-259573

(51) Int. Cl.$^7$ ................................................. G06K 9/00
(52) U.S. Cl. ...................... 382/172; 382/164; 382/171; 382/237; 358/466
(58) Field of Search ......................... 382/162, 164–166, 382/168–172, 232, 237, 270–273; 341/56; 345/600–602; 358/465–466, 518–525

(56) References Cited

U.S. PATENT DOCUMENTS

| | | | | |
|---|---|---|---|---|
| 5,295,202 A | * | 3/1994 | Steinkirchner et al. | 382/167 |
| 5,544,258 A | * | 8/1996 | Levien | 382/169 |
| 5,708,728 A | * | 1/1998 | Nomura | 382/162 |
| 6,172,767 B1 | * | 1/2001 | Takemoto | 358/1.9 |

* cited by examiner

Primary Examiner—Bhavesh M. Mehta
Assistant Examiner—Yubin Hung
(74) Attorney, Agent, or Firm—Westerman, Hattori, Daniels & Adrian, LLP

(57) ABSTRACT

The present invention concerns an image processing device and an image processing method for processing a decoded image, and its objective is to optimally binarize a decoded original. After the respective density histograms of colors R, G, and B have been drawn, the hierarchical relationship between the low-density-side peak value and high-density-side peak value is investigated. A color component which is to become a binarization object is determined based on the comparison results on the number of color components whose high-density-side peak value is/are higher and the number of color components whose low-density-side peak value is/are higher, and the color of the pixel to be outputted is determined based on the comparison of the pixel with a threshold value.

7 Claims, 23 Drawing Sheets

CASE WHERE TWO PEAKS HAVE ARISEN ON A HISTOGRAM

THRESHOLD VALUE DETERMINATION METHOD 1

THRESHOLD VALUE DETERMINATION METHOD 2

PEAK VALUE DETECTION (HIGHER PEAK VALUE IN THE HIGH-DENSITY REGION)

PEAK VALUE DETECTION
(HIGHER PEAK VALUE IN THE LOW-DENSITY REGION

CASE OF NON-WHITE/BLACK-PERMUTATED IMAGE

CASE OF WHITE/BLACK-PERMUTATED IMAGE

PREPARATION OF BINARY IMAGE FROM TWO COLOR COMPONENTS
(WHITE/BLACK PERMUTATION ABSENT)

WAVE SHAPE CALCULATED BASED ON THE MOBILE AVERAGE

HISTOGRAM PREPARED FROM A
TONE-DOWNGRADED IMAGE

IMAGE PROCESSING METHOD AND IMAGE PROCESSING DEVICE

FIELD OF THE INVENTION

The present invention concerns an image processing device which serves the function of decoding image information, such as an image scanner. The present invention concerns an image processing method which involves such an image processing device. In particular, it concerns threshold level determination and binarization methods for binarizing inputted images (especially color images).

DESCRIPTION OF THE RELATED ART

Image scanners have been utilized in the prior art for decoding image information. A fixed device the decoding unit of which is driven while an original is being set on it or one which decodes an image on an original which is being transported (e.g., flat bed model, etc.) has been used quite extensively.

In recent years, mobile computers have begun to be widely used, and it has become urgent to enable image inputs based on the uses of such mobile computers. In addition to fixed scanners, therefore, highly portable hand-held scanners which are operated manually have been developed and produced. When such a hand-held scanner is used, a user places the hand-held scanner on an original and then displaces the hand-held scanner manually, as a result of which the original is scanned, and the image on the original is decoded.

Since the hand-held scanner is based on a manual scan, the user may scan the original either laterally or longitudinally. This convenience, however, is offset by such problems as the input of a rotated image or the input of a mirror-modulated image depending on the scanning direction and the device orientation.

Compact devices, on the other hand, have generally come to be provided as hand-held scanners for improving the portability. For this reason, the width of its decoding unit becomes rather small, as a result of which the width which can be scanned on each occasion diminishes. When an original the width of which exceeds the effective decoding width of the scanner, it becomes necessary to scan its image on multiple takes and then to synthesize the respective batches.

SUMMARY OF THE INVENTION

A technique for automatically calibrating the orientation of an inputted document image and a technique for automatically synthesizing a document image from its dividedly inputted fragments are known in this context, but since the data volumes of multivalent images are larger than those of binary images, the memory capacity necessary for processing them becomes enlarged, which is also problematic in that the processing time is prolonged. It is therefore necessary to binarize images. In such a case, binarization routines optimally suited for images to be decoded must be executed.

The objective of the present invention, which has been conceived for solving these problems, is to provide an image processing method and an image processing device which enable the execution of a binarization routine optimally suited for an image to be decoded.

The aforementioned problems can be solved by drawing a histogram of the density values of the image data of the respective color components which have been obtained as a result of decoding, by calculating the high-density-side peak value and low-density-side peak value from the histogram, by judging their hierarchical relationship with regard to each of the respective color components, by counting the number of color(s) selected from among the multiple color components whose high-density-side peak values are higher than their low-density-side peak values, and by selecting an image which is to become a binarization object based on the obtained results.

In such a case, it is possible to compare the number of color(s) whose high-density-side peak values are higher and the number of color(s) whose low-density-side peak values are higher and then to select outnumbering color components as images which are to become binarization objects.

When an image is decoded in terms of three color components of R, G, and B, for example, the peak value hierarchical relationships among these three color components are analyzed. When R and G represent color components whose high-density peak values are higher and where B represents a color component whose low-density peak value is higher, therefore, components R and G are selected as binarization object images.

The respective pixels of the images of the respective color components which have been selected as binarization objects and preliminarily determined threshold levels are hereby compared, and pixels of the respective color components which exceed the threshold levels are judged to be either black or white, whereas the other pixels are judged to be the other.

In the case of the aforementioned example, the pixel of the component R and the pixel of the component G are compared with a certain threshold value (which may be a fixed threshold value or one dynamically calculated from the image decoding results). When at least either pixel of the component R or component G has exceeded the threshold value, binarization is carried out by assuming the pixel to be white, whereas the pixel is assumed to be black when neither color component has exceeded the threshold value.

When the number of color components whose low-density-side peak values are higher is larger than the number of color components whose high-density-side peak values are higher, on the other hand, the color components whose low-density-side peak values are higher are selected as binarization object images, and the white pixels and black pixels of the images are permutated during the binarization routine.

In a case contrary to the aforementioned one, namely a case in which the low-density peak values of the components R and G are higher and the high-density peak value of the component B is higher, the image of the component R and the image of the component G become binarization object images. It is highly likely, however, for such images to have been black/white-permutated, as a result of which problems such as a failure to recognize characters, etc. may arise. It is for this reason that the binarization results are hereby permutated and then outputted. In other words, pixels which have been judged respectively as white and black as a result of the threshold value comparison are outputted as black and white pixels.

It is also possible to judge directly that pixels which have exceeded the threshold value are black and that pixels which have not are white instead of resorting to the pixel permutation routine. It is essentially equivalent to the pixel permutation.

The rendition of a "white/black" judgment when the threshold value has been exceeded is a relativistic issue, and a scheme that judges a pixel to be either when it has exceeded the threshold value and to be the other when it has not essentially suffices.

A routine for determining the threshold value for a binarization routine may constitute an additional embodiment of the present invention. An example of threshold value determination methods is one wherein the low-density-side and high-density-side peaks of histograms are calculated with regard to the respective color components and wherein a density which serves as the exact middle point between the peaks is designated as a threshold level. When multiple peaks exist, furthermore, the highest peak in the low-density region and the highest peak in the high-density region are selected, and their intermediate value is designated as a threshold value.

When a histogram is sought, a wavy zigzag histogram shape may be obtained due to errors, etc. It is difficult to judge the density value peak on such a histogram, which becomes problematic during the threshold value determination. In such a case, the waviness of the histogram may be flattened based on the mobile average method or a method wherein a histogram is drawn at a downgraded tone number.

The aforementioned binarization method can be applied to an image processing device and an image processing method wherein characters are recognized, and/or wherein the image decoding directions are judged, and/or wherein the overlap positions of dividedly decoded image fragments are judged for synthesizing an image. The direction judgment and overlap position judgment results are used for the calibration of the inputted image.

The present invention also provides an image processing device which possesses a histogram generation mechanism which generates a density value histogram with regard to each color component by tabulating inputted pixels in density value-specific fashions, a peak detection mechanism which detects a low-density-side peak value and a high-density peak-side value on the density histogram, a color component selection unit which compares the hierarchical relationship between the detected low-density-side peak value and high-density peak-side value with regard to each color component and which executes a binarization routine based on the comparison results, and a binarization unit which binarizes the color component image which has been selected by the color component selection unit.

Such an embodiment may additionally possess a threshold value designation mechanism which designates a binarization threshold value based on the low-density-side and high-density-side peak values which have been detected by the peak detection unit.

It is also possible for the color component selection unit to count the number of color components whose low-density-side peak values are higher and the number of color components whose high-density-side peak values are higher and to judge that, when the number of color components whose high-density-side peak values are higher is larger, the pixels which exceed the threshold value with regard to the color components are either white or black, whereas when the number of color components whose low-density-side peak values are higher is larger, the pixels which exceed the threshold value with regard to the color components are the other.

Incidentally, concrete examples of the objective image processing devices include information processing devices in general to which various image input devices (e.g., image scanner, etc.) are connected, such as personal computers as well as image input devices themselves and other devices which serve image processing functions.

DESCRIPTION OF THE PREFERRED EMBODIMENTS

Figure 1:
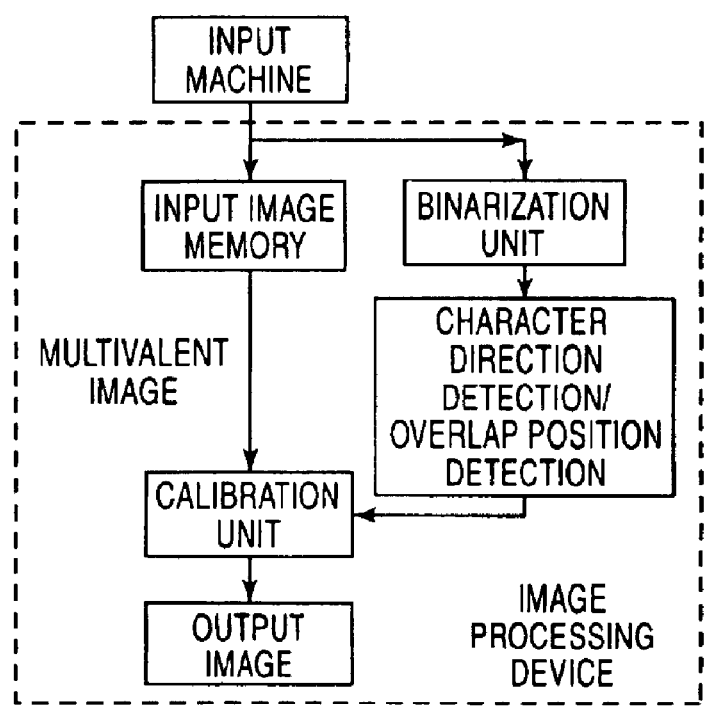
FIG. 1 is a block diagram of an image processing device according to the present invention.

FIG. 1 is a diagram which shows the constitution of the image processing device of an application example of the present invention. A hand-held scanner may, for example, be used as an input machine, although there are essentially no restrictions on the types of input machines. This input machine is capable of decoding an original as a multivalent image and of monochrome/color decoding actions. Such an input machine is connected to an image processing device such as a personal computer, and the multivalent image data outputted from the input machine are inputted into the image processing device.

The aforementioned multivalent image data is stored in an input image memory configured on the image processing device, as well as inputted into the binarization unit. The binarization unit calculates a threshold level for binarization based on the multivalent image data obtained from the input machine based on a method which will be discussed in detail below and then binarizes the multivalent image data. The binarized image data are subsequently inputted into the character direction detection/overlap position detection unit.

The character direction detection/overlap position detection unit (it may alternately be abbreviated as the "detection unit") detects the direction of the inputted characters based on the input image, as well as executes a routine for detecting the mutual overlap positions of dividedly decoded image fragments. When the character direction is detected, character information is extracted from the binarized image data, and a character recognition routine is executed in relation to the extracted character information. In such a case, the character information is rotated by 0°, 90°, 180°, and 270° whereas corresponding mirror-modulated character information is rotated by 0°, 90°, 180°, and 270° and a character recognition routine is executed in relation to each of these eight character information sets. The character recognition results detect the most likely character direction. Such a routine is disclosed in Japanese Laid-Open Patent Application No. HEI 11-338973.

When the overlap position is detected, furthermore, character information is extracted from each of the dividedly decoded binary image data fragments and then subjected to character recognition. A routine whereby character codes of the respective binary image fragments obtained as a result of the character recognition are compared and whereby the positions at which the respective character codes mutually coincide are detected as original overlap positions, furthermore, is executed. Such a routine is disclosed in Japanese Unexamined Patent Application No. HEI 11-111708.

The multivalent image data stored in the input image memory, on the other hand, are inputted into the calibration unit. The multivalent image data are processed based on the character direction/overlap position judged by the detection unit.

The orientations of inputted images themselves can be judged based on the judgments of character directions. For this reason, the calibration unit executes rotation and mirrorwise permutation routines based on the character direction judgment results received from the detection unit, based on which the direction of the inputted image is calibrated into the correct one.

The calibration unit, on the other hand, executes a calibration routine whereby dividedly decoded multivalent image fragments are synthesized into a singular image based on the overlap position information received from the detection unit.

The image which has thus been calibrated variously is outputted as an output image.

A case where an input machine and an image processing device are separate entities was explained above, however, it is also possible to output the multivalent image data which have been calibrated by routines up to the calibration stage executed by the input machine (i.e., image scanner) itself to a personal computer or another device.

In the following, a multivalent image which includes multiple color components (e.g., R, G, and B) will be explained, but the same principle applies to a multivalent image which includes monochrome color components (e.g., gray scale, etc.).

A histogram is drawn by calculating the respective frequencies of the color components R, G, and B of an input during the multivalent image binarization routine of the present application embodiment, and a binarization threshold value is determined by detecting the altitudes of peaks on the histogram.

Figure 2:
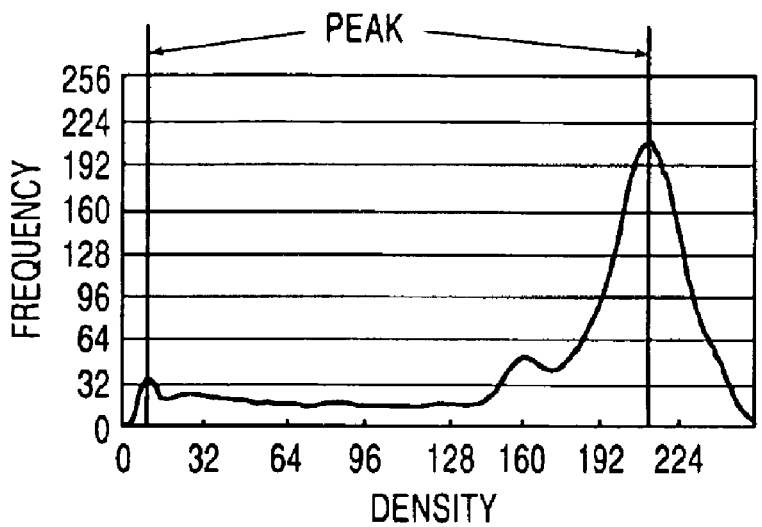
FIG. 2 shows the density histogram of a decoded image, and a case where two peaks have arisen.

When an image decoded from a segment binary document (e.g., newspaper, monochrome magazines, reports, etc.) is expressed on a histogram, two peaks, namely one corresponding to the character color and the other corresponding to the background color, can be observed, as FIG. 2 graphically illustrates. The altitudes of the two peaks thus formed on the histogram on the document image are calculated, and the median of the two is designated as a threshold value, as FIGS. 3 and 4 indicate. The threshold value can be thus determined based on the peak imputed to the character color and the peak imputed to the background color. Since the respective colors of the character and background segments can be differentiated into white and black pixels, optimal binarization results can be obtained.

Figure 3:
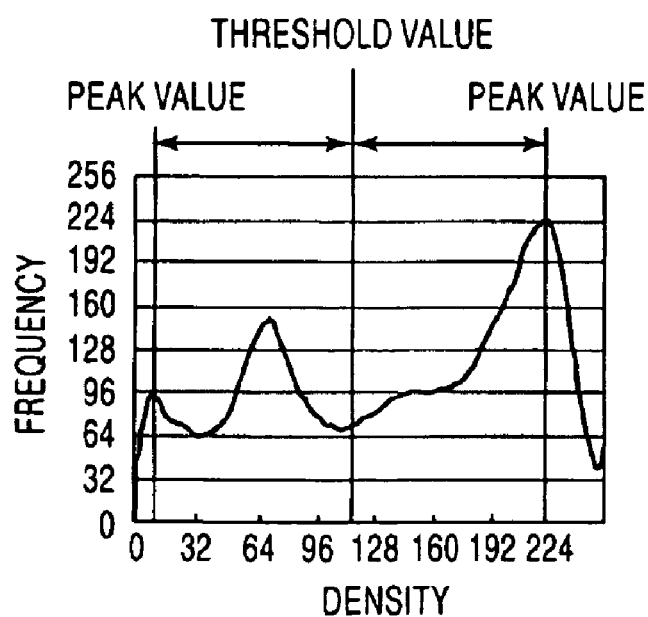
FIG. 3 shows an example of the threshold value determination method based on a histogram.
Figure 4:
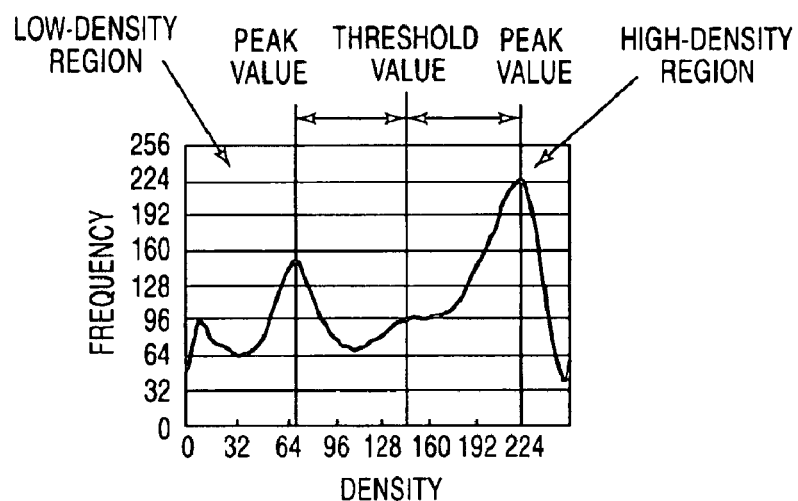
FIG. 4 shows another example of the threshold value determination method based on a histogram.

The median between the peak on the highest density side and the peak on the lowest density side is designated as a threshold value in the example of FIG. 3. In FIG. 4, in contrast, the spectrum is divided into two regions, namely high-density and low-density regions, at a density value in the vicinity of the median (in the vicinity of 126 in the case of a 256-tone scale). The highest peak in the low-density region and the highest peak in the high-density region are selected, and the median between the altitudes of the two peaks is designated as the threshold value.

It is necessary to take into account a document whereby white characters are written on black backgrounds, as in magazines, etc. When such a document is received polyvalently and then binarized, black/white permutations of the pixels may occur. The black/white-permutated images, however, cannot be recognized as characters, as a result of which it becomes impossible to detect the authentic direction of the input image or the overlap positions of a document image which has been inputted in multiple batches.

Figure 5:
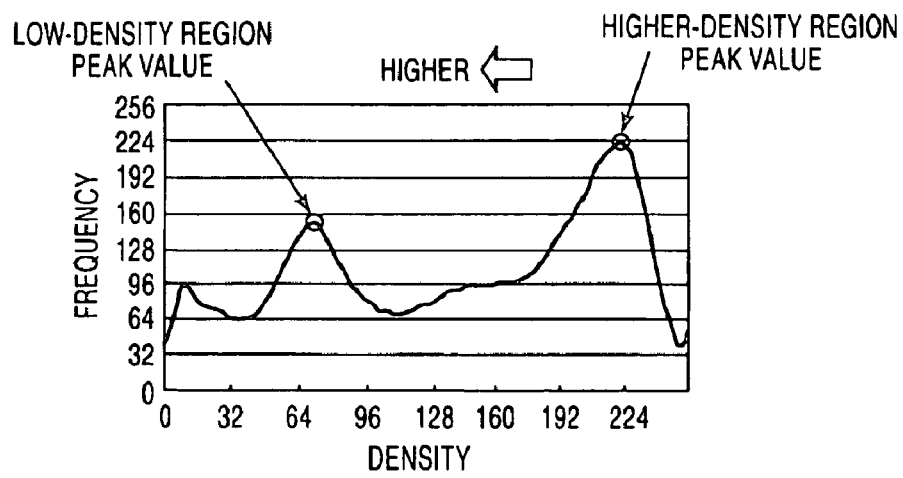
FIG. 5 shows a case where the peak value of the high-density region is higher.
Figure 6:
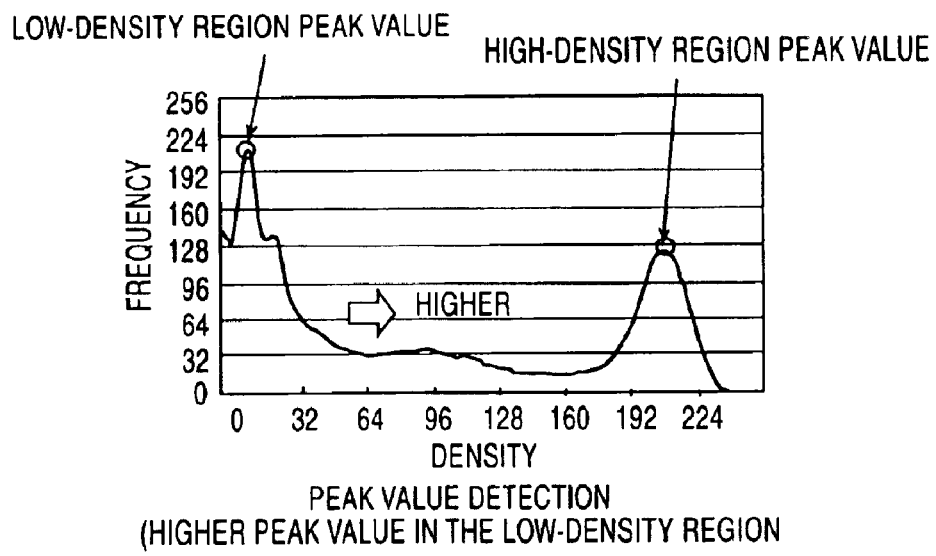
FIG. 6 shows a case where the peak value of the low-density region is higher.

As far as the present application embodiment is concerned, therefore, the frequencies of the respective color components R, G, and B of the inputted image are calculated, and after the respective color-specific results have been expressed on a histogram, the respective altitudes of the peak detected at a low-density position and the peak detected at a high-density position are compared with regard to each color. FIGS. 5 and 6 are diagrams which show density value histograms on a single color.

FIG. 5 shows a case where the altitude of the peak in the high-density region is higher than that of the peak in the low-density region. In this case, the density of the character segment is higher than that of the background segment. The inputted binary image is therefore not permutated. FIG. 6, on the other hand, shows a case where the altitude of the peak in the low-density region is higher than that of the peak in the high-density region. In this case, the density of the background segment is higher than that of the character segment. The inputted binary image is therefore permutated. The image of FIG. 6, which has been black/white-permutated, cannot be subjected to character recognition routines, but such an image can be calibrated by means of a routine whereby white and black pixels are mutually permutated, based on which a character recognition routine becomes possible.

When a color image is hereby inputted, density value histograms corresponding respectively to the three colors of R, G, and B are calculated. There is no guarantee, however, that the tendencies of the three colors are uniform. As far as the present application embodiment is concerned, therefore, when an input image consists of the three color components and where the respective altitudes of peaks detected at low-density and high-density positions are defined as U and T, the number of color(s) which satisfies U<T among the respective color components R, G, and B is counted. The white/black permutation of the binary image can be prevented by selecting a method for determining white and black pixels in accordance with the number that satisfies U<T.

Figure 7:
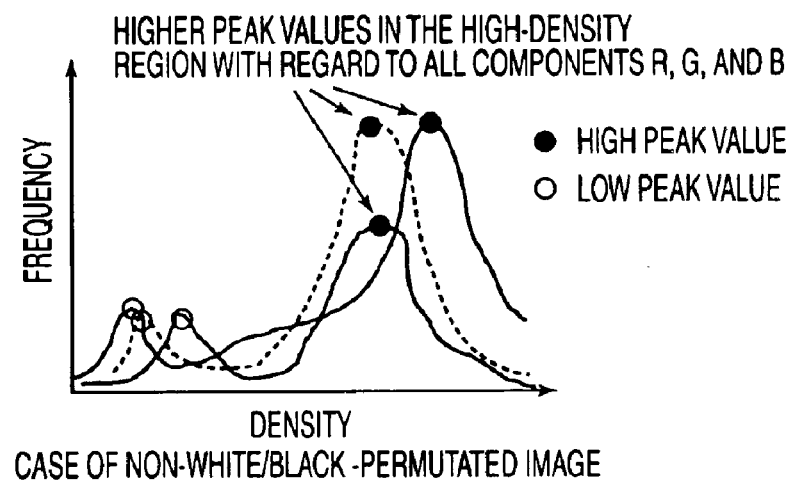
FIG. 7 shows a histogram pertaining to a non-white/black-permutated image.

1): An Embodiment where Three out of the Three Components R, G, and B Satisfy U<T (FIG. 7)

In this embodiment, the peak values of the high-density regions are higher than the peak values of the low-density regions with regard to all the respective colors R, G, and B. When all the three color components R, G, and B thus satisfy U<T, no color component contributes to white/black permutation. In the example of FIG. 7, therefore, a binarization routine is executed while pixels whereby at least two of the three color components exceed certain threshold values are being defined as white and all the other pixels as black.

Figure 8:
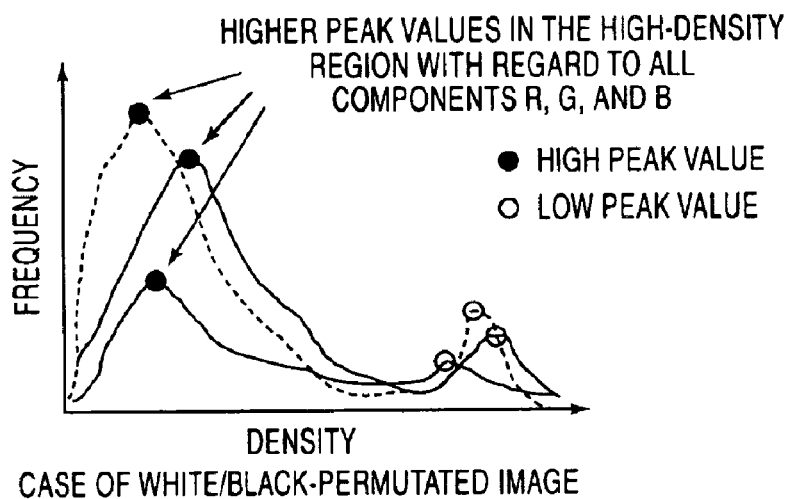
FIG. 8 shows a histogram pertaining to a white/black-permutated image.

2): An Embodiment where Zero Color Satisfies U<T (FIG. 8)

In this embodiment, the peak values of the low-density regions are higher than the peak values of the high-density regions with regard to all the respective colors R, G, and B. When zero out of three color components thus satisfies U<T, all the color components contribute to white/black permutation. The white pixels and black pixels must therefore be mutually permutated in the example of FIG. 8. In such a case, a binarization routine is executed while pixels whereby at least two of the three color components exceed certain threshold values are being defined as black and all the other pixels as white.

Figure 9:
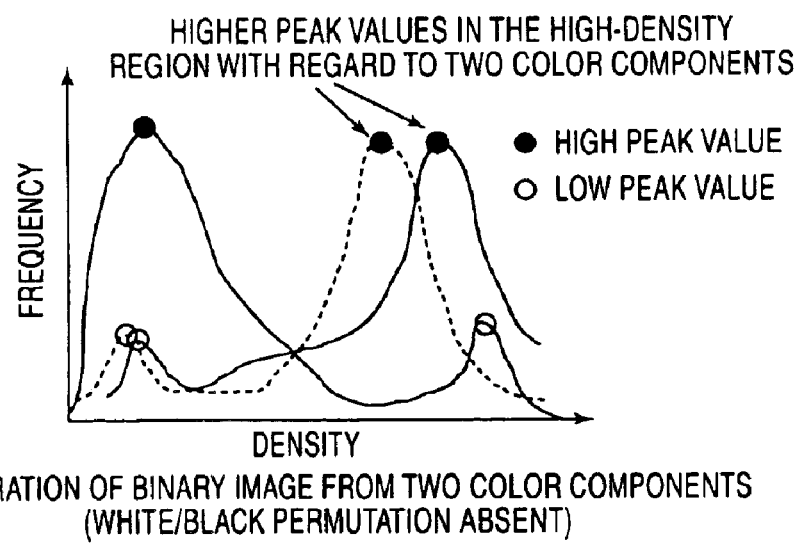
FIG. 9 shows an example for preparing a binary image from two color components under the non-pervasion of the white/black permutation.

3): A Case where Two Colors Satisfy U<T (FIG. 9)

When two out of the three color components satisfy U<T, said two components do not contribute to white/black permutation, whereas only the remaining one does. As far as the example of FIG. 9 is concerned, therefore, these two components which satisfy U<T are conceptually emphasized, and a binarization routine is executed while pixels whereby at least either of these two color components exceeds a certain threshold value is being defused as white and all the other pixels as black. The color component which satisfies U>T, on the other hand, is not subjected to a binarization routine.

Figure 10:
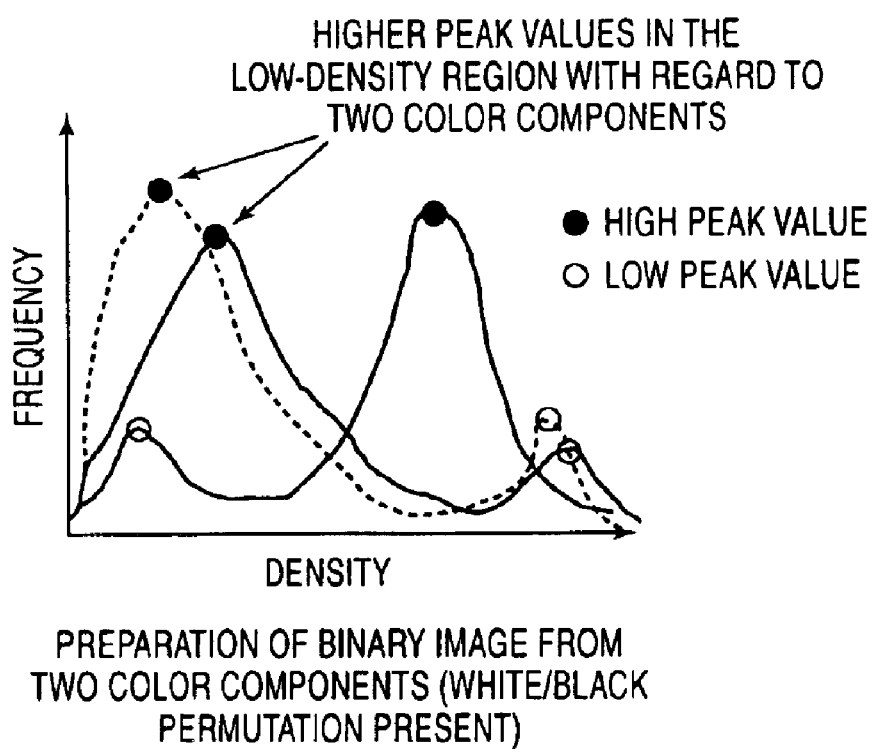
FIG. 10 shows an example for preparing a binary image from two color components under the pervasion of the white/black permutation.

4): A Case where One Color Satisfies U<T (FIG. 10)

When only one out of the three color components satisfies U<T, said one component does not contribute to white/black permutation, whereas the other two do. As far as the example of FIG. 10 is concerned, therefore, the two components which fail to satisfy U<T are conceptually emphasized, and a binarization routine is executed while pixels whereby at least either of these two color components exceeds a certain threshold value is being defined as black and all the other pixels as white. Contrary to the example of FIG. 10, the color component which satisfies U<T is not utilized for the binarization routine.

As far as the present application embodiment is concerned, therefore, histograms are calculated for the respective colors R, G, and B, and whether or not the input image has been white/black-permutated is judged based on the comparison of the respective peak values, their hierarchical relationships, and their numbers. For this reason, the presence or absence of the white/black permutation can be effectively judged, as in the case of a monochrome image.

Next, an image processing method which utilizes the image processing device of the present application embodiment will be explained.

Figure 11:
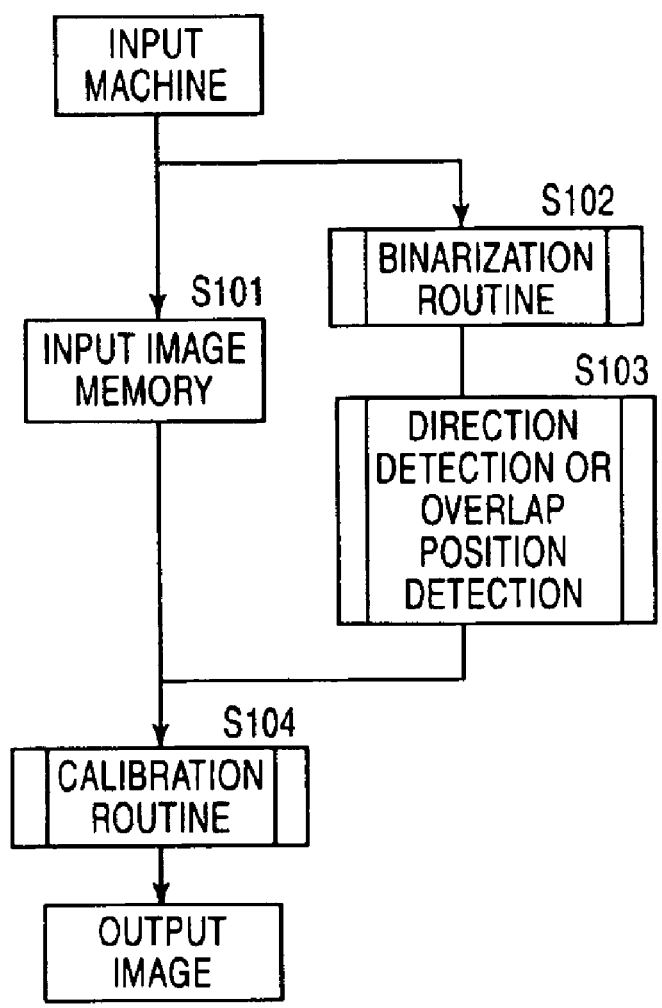
FIG. 11 is a flow chart which shows the image processing procedures of an application example.

FIG. 11 is a flow chart which shows the processing procedures of an application embodiment, and it is applied to the image processing device shown in FIG. 1.

Once an image input routine which uses an input machine has been initialized, the inputted multivalent image is temporarily stored in an input image memory (S101). A routine for binarizing the inputted image is concurrently executed (S102).

Figure 12:
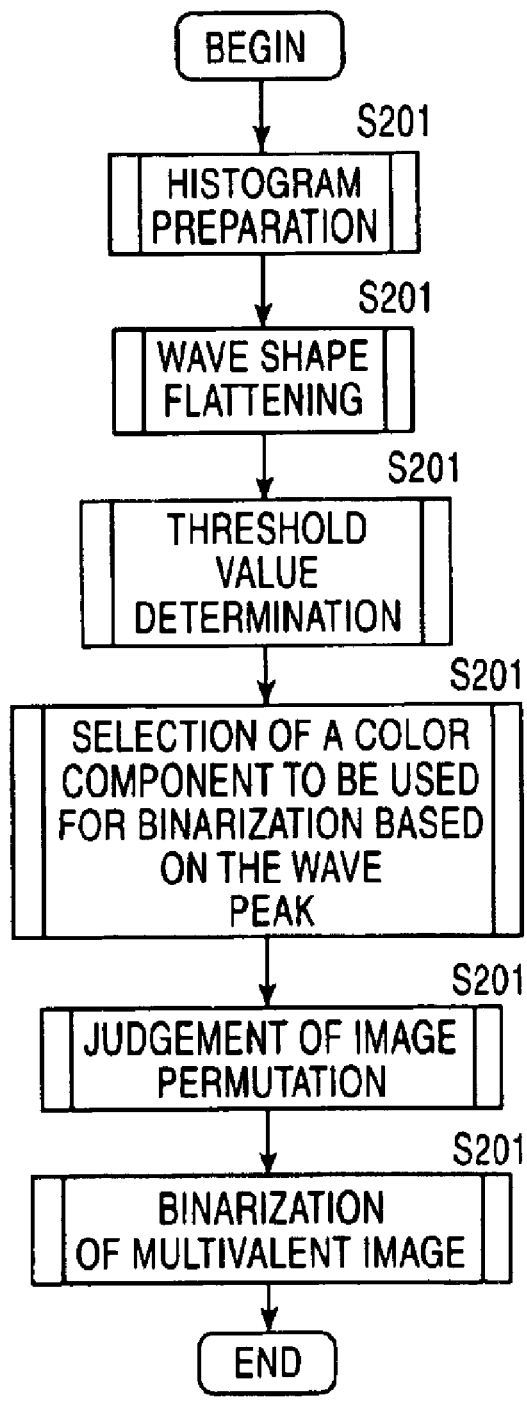
FIG. 12 is a flow chart which shows the detailed procedures of a binarization routine.

FIG. 12 is a flow chart which shows detailed procedures of the binarization routine at S102.

In FIG. 12, the density value of the input image is judged in a pixel-specific fashion, and after the results have been tabulated in density value-specific fashions, a histogram of the respective density values is obtained (S201). Incidentally, the density value histogram may be prepared from one entire sheet of the decoded image, or the histogram may be prepared from a partial image at a stage where a certain volume of image data has been transferred from the input machine.

A routine for flattening the histogram wave shape is subsequently executed (S202).

Figure 13:
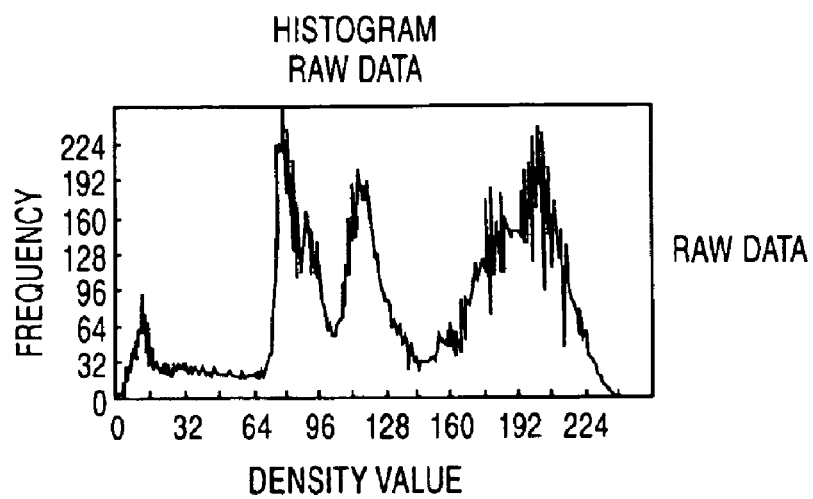
FIG. 13 is a diagram which shows a density histogram prior to the flattening of the wave shape.

In the cases of input machines with inferior noise performances, input machines with minimal sensor outputs, etc., the color reproducibilities of their output images deteriorate, and as a result, histograms with edgy wave shapes may be obtained, as FIG. 13 graphically illustrates. In such a case, it becomes difficult to detect the peaks of the histograms. It is for this reason that the edgy wave shapes are flattened.

Figure 14:
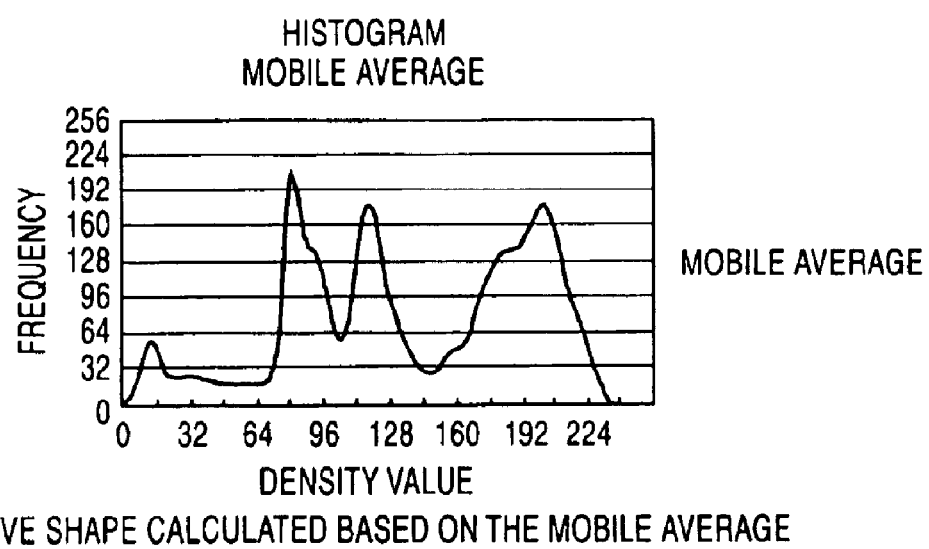
FIG. 14 is a diagram which shows a density histogram the wave shape of which has been flattened based on the mobile average method.

FIG. 14 is a diagram which shows a histogram the wave shape of which has been flattened based on the mobile average method. Thus, it becomes easier to detect the density value peak by flattening the histogram in comparison with the histogram shown in FIG. 13.

Figure 15:
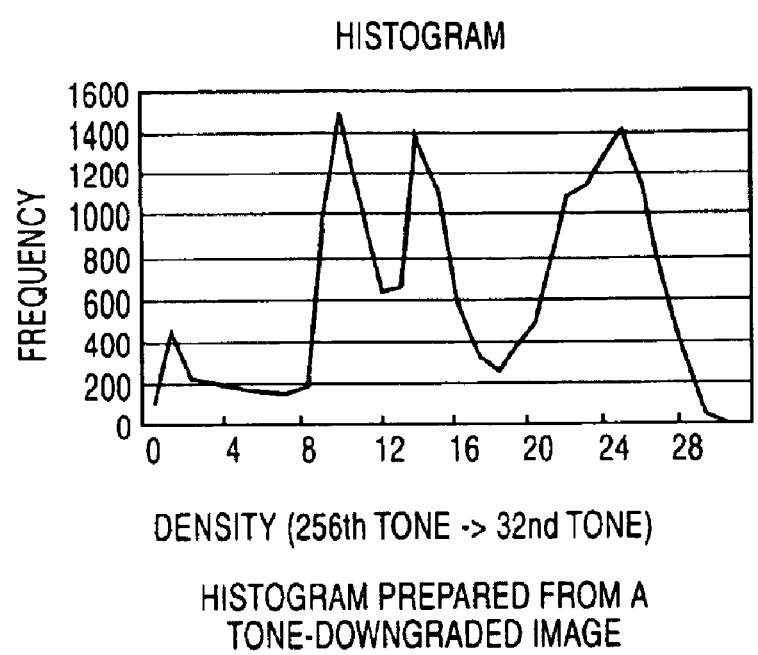
FIG. 15 is a diagram which shows a density histogram derived from a tone-downgraded image.

As FIG. 15 graphically illustrates, furthermore, it is also possible to downgrade the tone number of the image received from the input machine and to draw a histogram from the obtained tone-downgraded image. The wave shape of the histogram drawn from the tone-downgraded image becomes flatter than that of a histogram drawn from a non-tone-downgraded image, based on which the calculation of the peak altitudinal value is facilitated.

Subsequently, a threshold value is determined based on the flattened histogram (S203). The threshold value determination method may, for example, be based on a method wherein a median between the low-density and high-density peak values is designated as a threshold value, as has been mentioned earlier.

Next, color components to be subjected to a binarization routine are determined based on the peak values of the histogram waves (S204). In this case, too, the binarization routine can be executed by determining the color components to be used for binarization based on the number of color components which satisfy U<T, as has been mentioned earlier.

The presence or absence of a white/black-permutated is judged based on the routine at S206. The inputted multivalent image, furthermore, is binarized based on the threshold value determined at S203. In this case, the image which becomes a binarization objective is the color images selected at S204.

After the routine for binarizing the multivalent image at S102 has been executed, a routine for detecting the direction of the inputted image and for detecting the overlap position is executed (S103). This routine itself is disclosed in aforementioned Japanese Laid-Open Patent Application No. HEI 11-338973.

A routine for calibrating the multivalent image is subsequently executed based on the character direction and overlap position information detected at S103. As a result, the direction may be calibrated into the authentic one, or a singular image may be synthesized from divided decoded image fragments.

Figure 16:
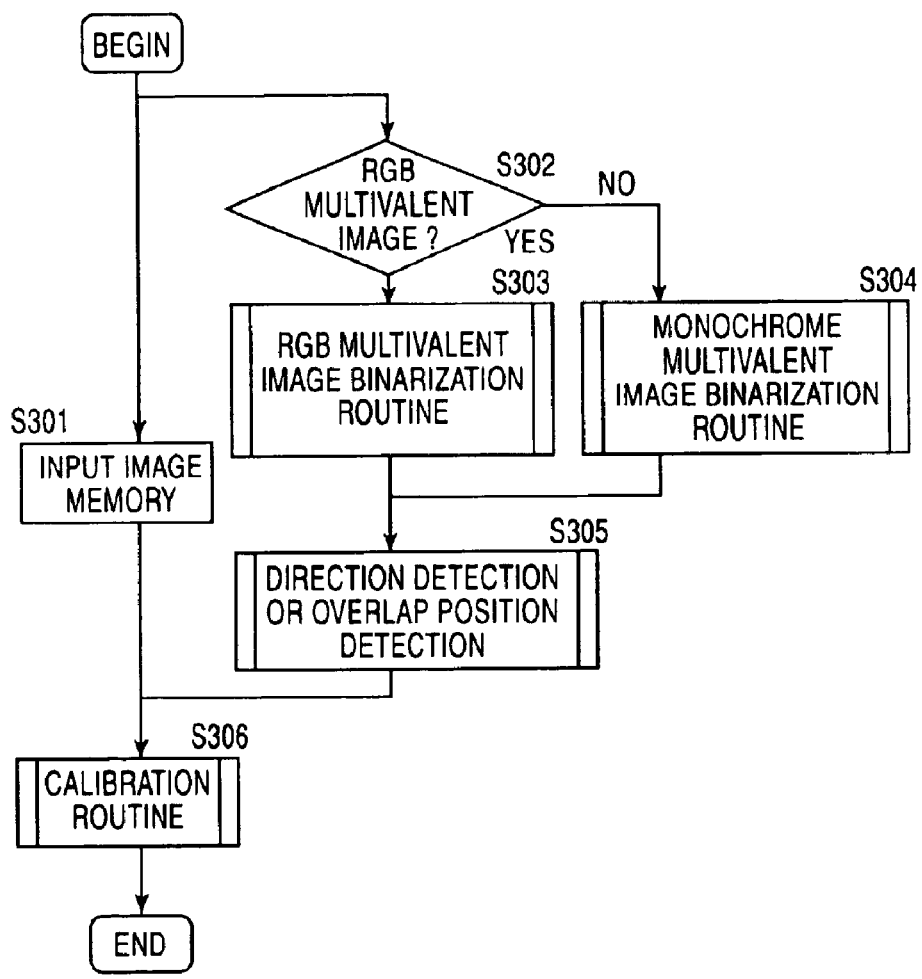
FIG. 16 is a flow chart which shows the image processing procedures of another application example.

FIG. 16 is a flow chart which shows the image processing procedures of another embodiment. A method for selecting a variable binarization routine is used depending on whether the inputted image is a color image or monochrome image.

The multivalent image which has been inputted from the input machine is first stored in the image memory (S301). A routine for binarizing the multivalent image which has been inputted from the input machine is concurrently executed.

It is judged first whether or not the inputted multivalent image is an image which possesses components R, G, and B (S302). When the inputted multivalent image has been judged to possess three mutually independent color components R, G, and B, a transition is made to S303, where a binarizing routine specific to multivalent images is executed. When the inputted multivalent image has been judged to be a monochrome image, on the other hand, a transition is made to S304, where a binarizing routine specific to monochrome images is executed.

There are known input machines which allow users to arbitrarily designate the number of colors to be decoded during their operations, and when such a device is used, the designated color number is referred to by the image processing device, and it is possible to judge that a multivalent color image has been inputted when a multiple number of colors have been designated and that a monochrome image has been inputted when only one color is designated.

Figure 17:
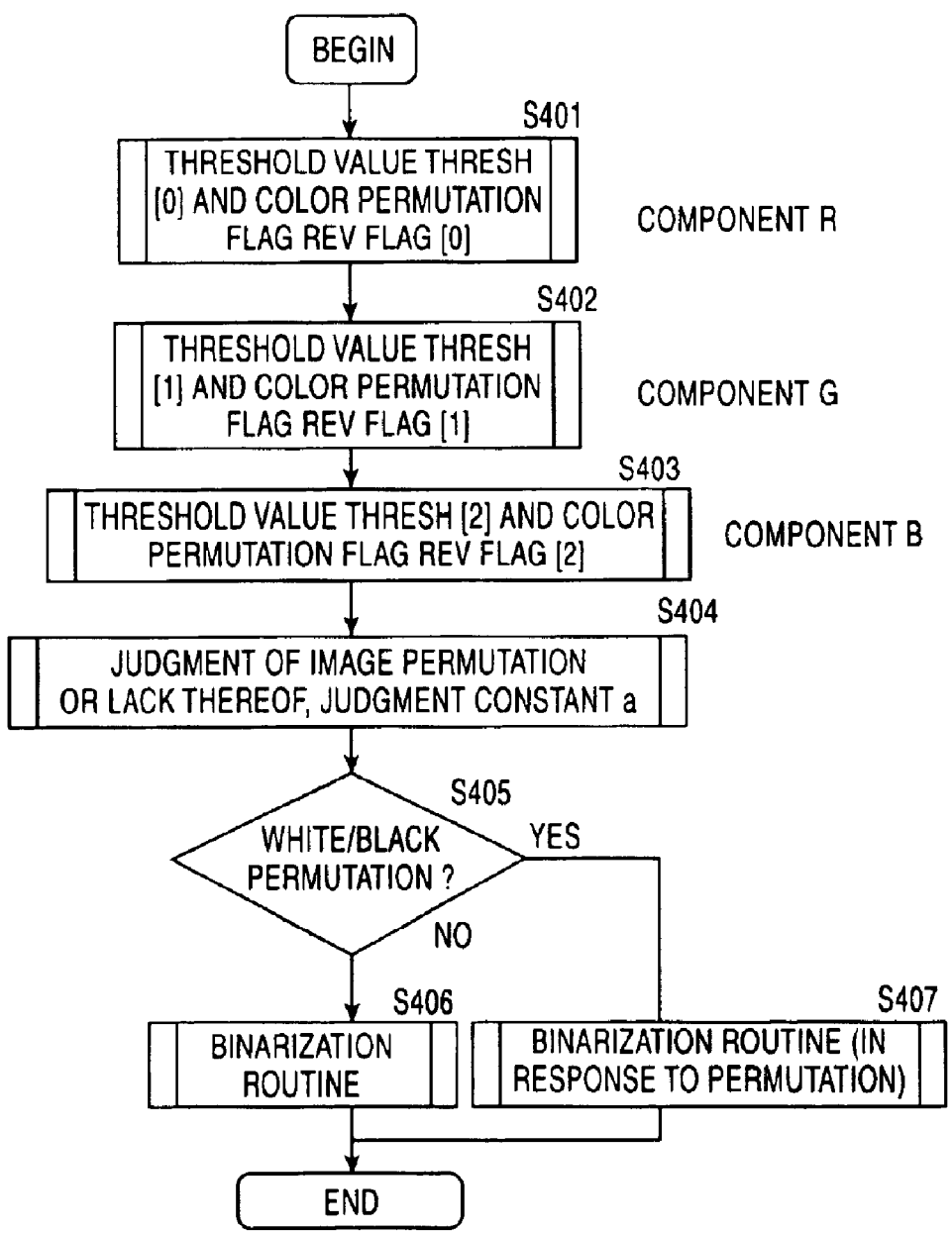
FIG. 17 is a flow chart which shows a binarization routine in detail.

FIG. 17 is a flow chart which shows the binarization routine executed at S303 in detail.

First, the binarization threshold value for the component R and a flag for detecting whether or not the image of the component R is a permutated image are sought at S401.

When the threshold value for the component R and the flag are defined as thresh [0] and rev flag [0], respectively, the following can be ascertained: Thresh [0]: (0 to 255); rev flag [0]: (0, 1). In other words, the value of thresh [0] is any ranging from 0 to 255, whereas the value of rev flag [0] is either 0 or 1. It is hereby judged that the image is a non-permutated one when rev flag [0] is 0 and that it is a permutated one when it is 1.

Similarly, the threshold value thresh [1] for the component G and the flag rev flag [1] for detecting whether or not the image of the component G is a permutated image are sought at S402, and the following are ascertained: Thresh [1]: (0 to 255); rev flag [1]: (0, 1).

The threshold value thresh [2] for the component B [and] the flag rev flag [2] for detecting whether or not the image of the component B is a permutated image are sought at S403, and the following are ascertained: Thresh [2]: (0 to 255); rev flag [2]: (0, 1).

Figure 18:
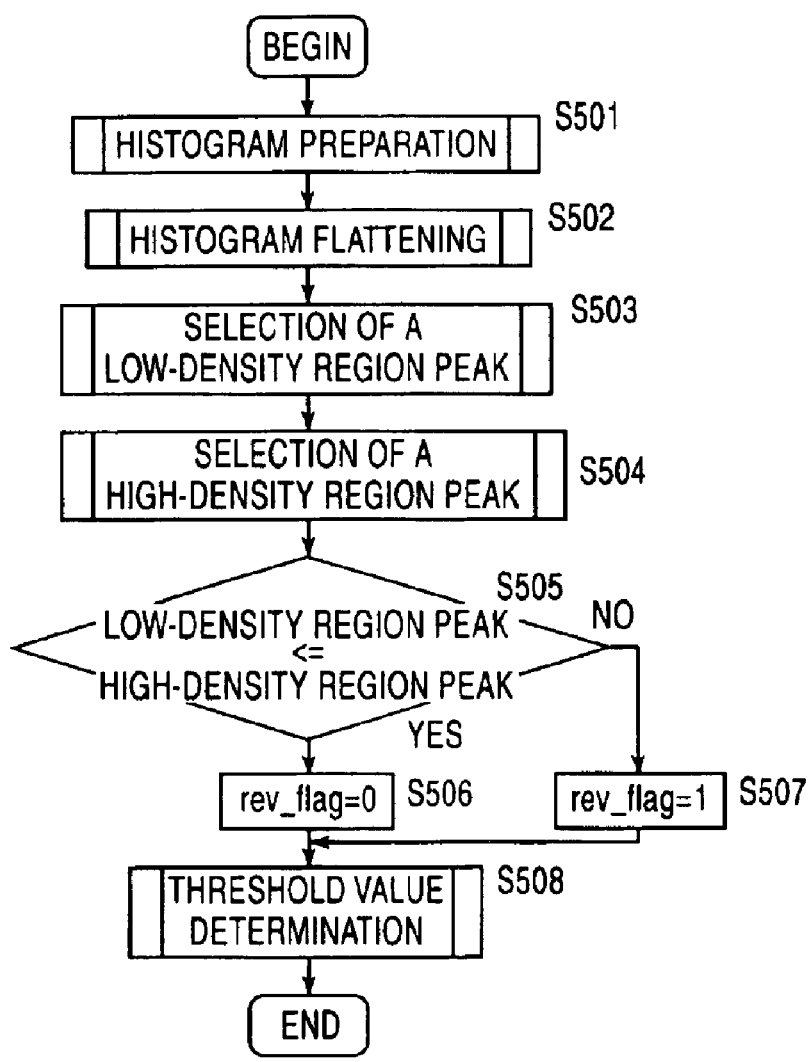
FIG. 18 is a flow chart which shows detailed threshold value determination procedures.

FIG. 18 is a flow chart provided for explaining the aforementioned routines of S401 through S403 in further detail.

The frequencies of the respective inputted color components are first detected at S501, and a histogram is drawn.

A routine for flattening the prepared histogram is subsequently executed at S502. Next, a peak for calculating the threshold value is detected from among multiple peaks which exist in the low-density region (S503).

When an image which has been decoded from a document on which photographs or drawings have been printed (e.g., magazines, catalogs, etc.) is expressed on a histogram, multiple peaks other than the peak imputed to the character color and background color may arise. In such a case, a peak the density of which is the lowest along the x axis is selected from among the multiple peaks emerging on the histogram. It is also possible to select a peak the density of which is the highest within a region lower than the median density along the x axis from among the multiple peaks emerging on the histogram.

A peak which is to be used for the calculation of a threshold value is subsequently selected from among the multiple peaks that exist in the high-density region at S504. In such a case, a peak arising at the highest density along the x axis is selected from among the multiple peaks that have arisen on the histogram. It is also possible to select a peak the density of which is the highest within a region higher than the median density along the x axis from among the multiple peaks emerging on the histogram.

Next, the altitudinal values of the two peaks selected respectively at S503 and S504 are compared at S505.

When the altitude of the peak that represents the high-density region is higher than that of the peak that represents the low-density region, it is indicative of the non-permutation of the corresponding color component, and accordingly, a transition is made to S506. Conversely, when the altitude of the peak that represents the low-density region-is higher than that of the peak that represents the high-density region, it is indicative of the permutation of the corresponding color component, and accordingly, a transition is made to S507.

When the altitude of the peak that represents the high-density region is higher, it is indicative of the non-permutation of the corresponding color component, and accordingly, rev flag=0 is designated at S506.

When the altitude of the peak that represents the low-density region is higher, on the other hand, it is indicative of the permutation of the corresponding color component, and accordingly, rev flag=1 is designated at S507.

The threshold value is then determined at S508.

As far as threshold value designation procedures are concerned, the altitudinal values of the peak designated to represent the low-density at S503 and of the peak designated to represent the high-density density at S504 may, for example, be calculated, and the median value of the altitudinal values of the two peaks is designated as a threshold value.

The threshold value of the inputted color component and the presence or absence of permutation can be detected based on the foregoing procedures.

Subsequently, it is judged whether the image inputted at S404 is permutated with reference, once again, to FIG. 17. The permutated image judgment constant of the image is defined as follows: a=rev flag [0]+rev flag [1]+rev flag [2]. In terms of the a value, a<=1 (normal image) and 1<a (permutated image) are ascertained.

Next, the ordinary image and permutated image divide are subjected to a binarization routine at S405 based on the judgment results obtained at S404.

A case where a<=1 holds suggests the pervasion of a normal image, and accordingly, a transition is made to S406.

A case where 1<a holds suggests the pervasion of a permutated image, and accordingly, a transition is made to S407.

The image binarization threshold value is hereby defined as "Athresh."

The following are designated by using the previously defined permutated image judgment constant a: 1): a=0: Athresh=2 or 3; 2): a=1: Athresh=1 or 2; 3): a=2: Athresh=1 or 2; 4): a=3: Athresh=2 or 3. When it is hereby judged whether or not at least two of the image color components R, G, and B have exceeded certain threshold values, two or more values are ascertained as the Athresh values of 1) and 3 ). For this reason, either 2 or 3 may be selected as the Athresh value.

When it is hereby judged whether or not at least one of two color components has exceeded a certain threshold value, one or more values is ascertained as the Athresh values of 2) and 4). For this reason, either 1 or 2 may be selected as the Athresh value.

The respective density values of the color components R, G, and B with regard to each pixel are hereby defined as Rs, Gs, and Bs, and the constants R flag, G flag, and B flag, which serve functions of judging whether or not the respective density values of each pixel have exceeded their respective threshold values, are calculated.

In other words, the following are ascertained: R flag–1, when Rs≧thresh [0] (1 when the threshold value is exceeded); G flag=1, when Gs≧thresh [1] (1 when the threshold value is exceeded); B flag=1, when Bs≧thresh [2] (1 when the threshold value is exceeded).

A binarization routine is executed at S406 by using the threshold values calculated above. The routine is hereby divided into the following two phases depending on the value of the permutated image judgment constant a:
1): Case of a=0
  Athresh R flag+G flag+B flag: White;
  Athresh>R flag+G flag+B flag: Black.

The constants R flag, G flag, and B flag, which respectively judge whether or not the components R, G, and B have exceeded their respective threshold values, are added up, and when the obtained value exceeds the threshold (Athresh), the pixel is judged to be white, whereas when the value does not, the pixel is judged to be black.
2): Case of a=1

Judgments are hereby rendered upon the removal of a color component of rev flag [ ]=1. The following can be ascertained should rev flag [0]=1 (component R) hold:
  Athresh G flag+B flag: White;
  Athresh>G flag+B flag: Black.

The judgment constants of the two color components other than that characterized by rev flag [ ]=1 (G flag and B flag in this case) are added up, as in the case of 1), and when the obtained value exceeds the threshold (Athresh), the pixel is judged to be white, whereas when said value does not, the pixel is judged to be black.

The pixels sought at the time of the binarization routine, on the other hand, are white/black permutated at S407. The routine is divided into the following two phases depending on the value of the permutated image judgment constant a, as in the case of S406:
3): Case of a=2
  Athresh R flag+G flag+B flag: White;
  Athresh>R flag+G flag+B flag: Black.

The constants R flag, G flag, and B flag, which respectively judge whether or not the components R, G, and B have exceeded their respective threshold values, are added up, and when the obtained value exceeds the threshold (Athresh), the pixel is judged to be black, whereas when said value does not, the pixel is judged to be white.
4: Case of a=3

Judgments are hereby rendered upon the removal of a color component of rev flag [ ]=0. The following can be ascertained should rev flag [0]=0 (component R) hold:
  Athresh G flag+B flag: Black;
  Athresh>G flag+B flag: White.

The judgment constants of the two color components other than that characterized by rev flag [ ]=1 (G flag and B flag) are added up, as in the case of 3), and when the obtained value exceeds the threshold (Athresh), the pixel is judged to be black, whereas when said value does not, the pixel is judged to be white.

Thus, the colors of pixels selected respectively in the cases of 3) and 4) are the opposite of those in 1) and 2).

The permutation of the image or lack thereof during binarization is automatically judged based on the foregoing actions, based on which the inputted multivalent image (which includes components R, G, and B) can be optimally binarized.

Figure 19:
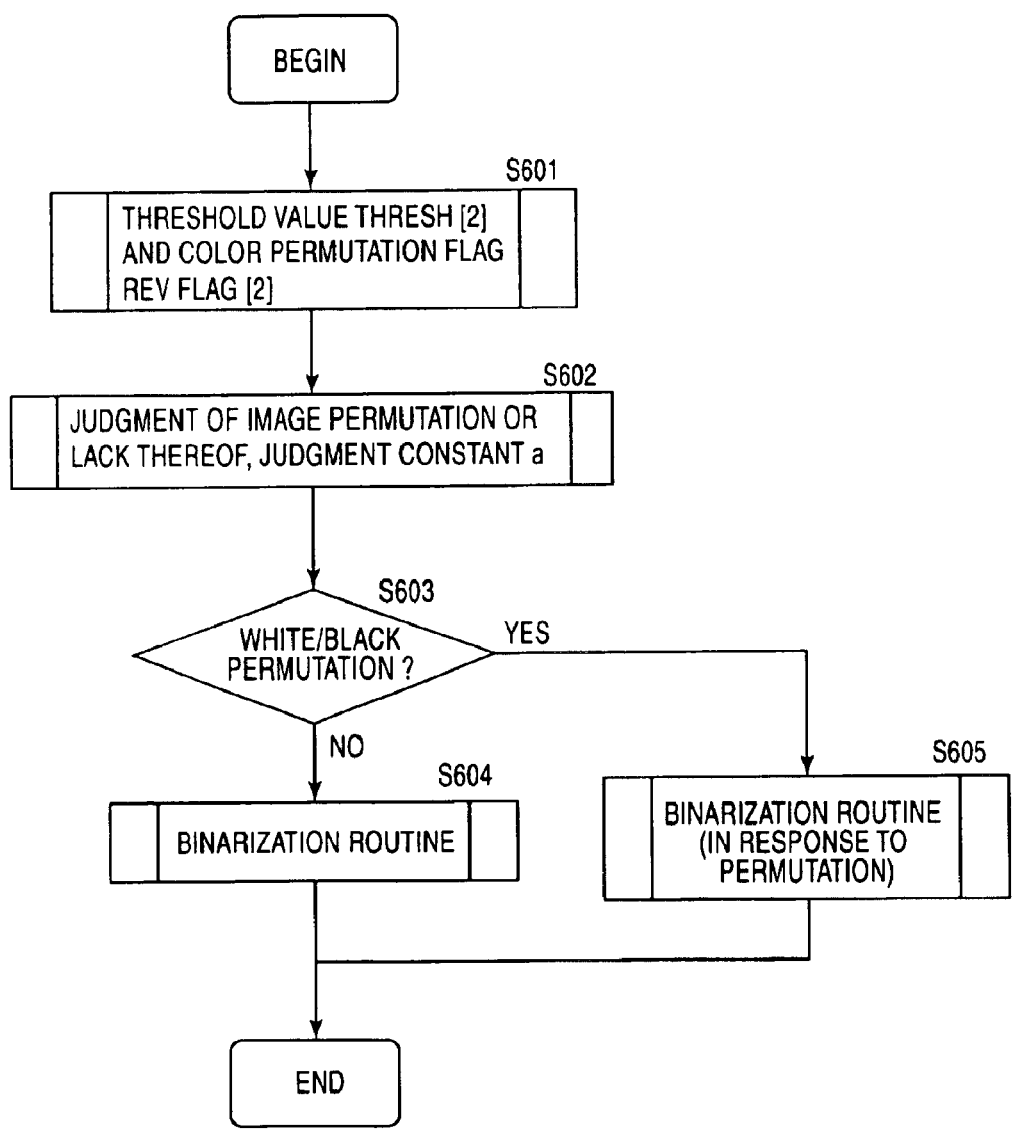
FIG. 19 is a flow chart which shows a monochrome image binarization routine.

FIG. 19, on the other hand, is a flow chart which shows the procedures of the routine for binarizing a monochrome multivalent image at S304.

First, the threshold value for the monochrome component and a flag for detecting whether or not the image is a permutated one are sought at S601. The routine at S601 is executed according to procedures similar to those of the aforementioned routines at S401 through S403, and the threshold value and flag are respectively designated as follows: Thresh [0]: (0 to 255); rev flag [0]: (0, 1).

It is subsequently judged at S602 whether or not the inputted image is permutated. The judgment constant (i.e., permutated image judgment constant a) is defined as follows: a=rev flag [0].

Next, the remainder of the routine is branched into two at S603.

A transition is made to S604 in the case of a=0.
A transition is made to S605 in the case of a=1.

The monochrome component density of each pixel is hereby defined as Gs. The constant G flag, which judges whether or not the color component of each pixel exceeds the threshold value, furthermore, is expressed by the following formula:

G flag=1, when Gs≧thresh [0] (1 when the threshold value is exceeded). When a=1 holds, a binarization routine is executed at S604 in such a way that G flag=1: White and G flag=0: Black will hold. In other words, the pixel is judged to be white when the G flag is 1, whereas the pixel is judged to be black when the G flag is 0.

A (binarization+permutation) routine is subsequently executed at S605. In such a case, the conditions of G flag=0: White and G flag=1: Black hold. In other words, the pixel is judged to be white when the G flag is 0, whereas the pixel is judged to be black when the G flag is 1.

It is automatically judged whether or not the image is permutated during its binarization based on the foregoing actions, as a result of which the-inputted monochrome multivalent image can be optimally binarized.

It can be seen with reference once again to FIG. 16 that the direction of the non-permutated inputted image and the overlap positions of multiple dividedly decoded image fragments are detected at S305 based on the image binarized at S303 or S304.

The multivalent image which has been stored in the image memory at S301 is subsequently calibrated at S306 based on the results obtained at S305.

Not only a multivalent image which includes color components R, G, and B but also a monochrome multivalent image can be optimally binarized based on the foregoing actions, based on which the direction of the inputted multivalent image may be calibrated into the non-permutated one, or multivalent image fragments which have been inputted in multiple batches may be put together.

The optical resolution of an image input device wherein input image data are obtained by photoelectrically converting optically decoded document information (e.g., scanner, etc.) is often fixed monolithically. Output image data, on the other hand, are often obtained by enlarging or reducing the input image data depending on user needs. In such a case, a software-based resolution conversion routine is executed. The image quality, however, deteriorates in comparison with the input image data due to information deletion in the enlargement mode and to an increase in the amount of ambiguous information (which is in turn attributed to complementary routines) in the reduction mode.

As far as techniques for automatically calibrating the image directions and techniques for automatically synthesizing images are concerned, on the other hand, the respective image orientation and overlap position detection precisions are greatly affected by the image resolution and image quality. When the input image data resolution is confined to an appropriate range for these routines and where the resolution of the output image is identical to that of the input image data, the respective detection precisions are maximized, whereas when an output image which has been subjected to an enlargement or reduction routine depending on users' needs is used, the detection precisions inevitably deteriorate.

The volumes of processed data, furthermore, are large in these routines, including the resolution conversion, and since the processing procedures also become complicated, the memory capacity necessary for such routines is enlarged, as a result of which the processing time is prolonged.

When an inputted image is outputted after its resolution has been converted to a desired level, therefore, the following method is utilized during the execution of a routine for judging the character direction or the overlap position.

Figure 20:
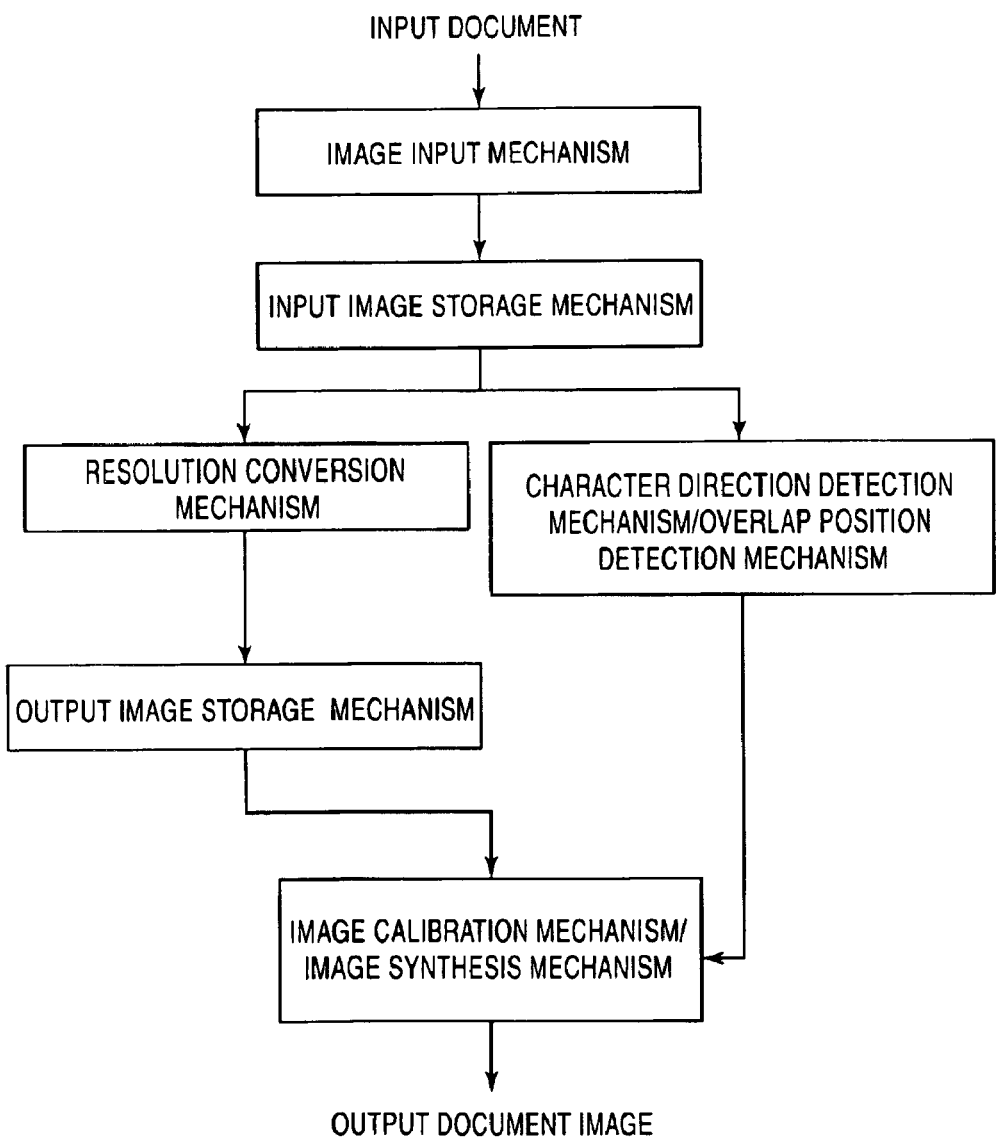
FIG. 20 is a flow chart which shows the image processing procedures of still another application example.

FIG. 20 graphically illustrates the constitution of an image processing device to which the aforementioned method is applied, and it is virtually identical to the device shown in FIG. 1. The methods explained above, furthermore, can be directly applied for various routines (e.g., binarization, white/black permutation judgment, etc.), and therefore, no detailed explanations will be provided.

As far as the image processing device of the present application embodiment is concerned, an inputted image is subjected individually to a resolution conversion routine and a character direction detection and overlap position detection routine, and not only may the direction of an eventually obtained output image the resolution of which has been adjusted at a level designated by a user be calibrated automatically based on the character direction detection and the overlap position detection results, but an output image the resolution of which has been adjusted at a level designated by a user may also be obtained by automatically synthesizing dividedly decoded input image fragments obtained as multiple batches.

In this case, the routine for detecting the character direction or for detecting the position detection is executed in relation specifically to input image data the resolution of which is specific to an image input mechanism, and therefore, image quality deteriorations imputed to a resolution conversion routine can be avoided, and a high detection precision can be achieved.

Figure 21:
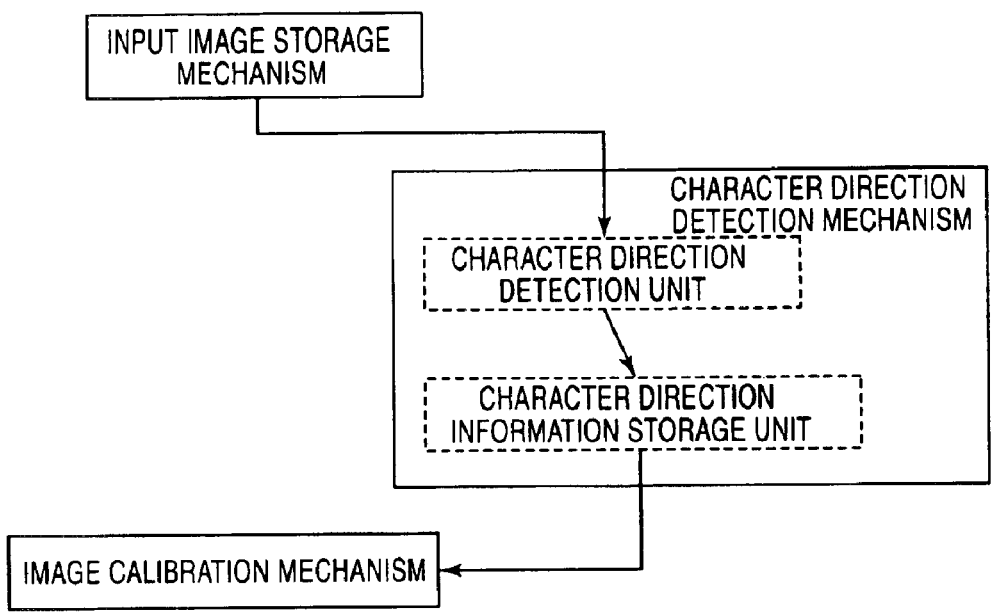
FIG. 21 is a diagram which shows a binary image character direction detection mechanism.
Figure 22:
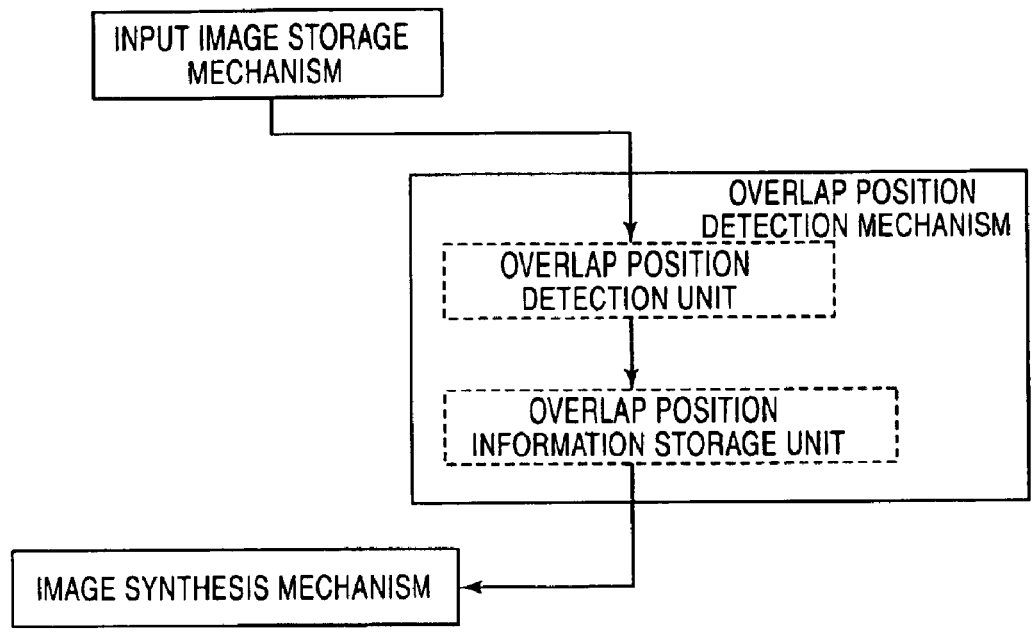
FIG. 22 is a diagram which shows a binary image overlap position detection mechanism.

FIGS. 21 and 22 respectively show the constitutions of a character direction detection mechanism and an overlap position detection mechanism when input image data based on the binarized image data format are involved. In such a case, an input image is inputted into the character direction detection mechanism or overlap position detection mechanism.

As FIG. 21 graphically illustrates, the character direction detection mechanism possesses a character direction detection unit and a character direction information storage unit. The character direction detection unit serves a function of detecting the direction of the input image based on the method explained earlier, whereas the character direction information storage unit temporarily stores information which indicates the character direction judged by the character direction detection unit (i.e., image direction). The character direction information which is being stored in the character direction information storage unit is transferred to an image calibration unit, whereas the image calibration unit calibrates the direction of the input image into the non-permutated one based on the received character direction information.

As FIG. 22 graphically illustrates, furthermore, the overlap position detection mechanism possesses an overlap position detection unit and an overlap position storage unit. The overlap position detection unit serves a function of detecting the overlap position of image fragments which have been dividedly decoded by the method mentioned earlier, whereas the overlap position storage unit temporarily stores information which indicates the overlap position of the respective image fragments detected by the overlap position detection unit. The overlap position information which is being stored in the overlap position storage unit is transferred to an image synthesis mechanism, whereas said image synthesis mechanism synthesizes the respective dividedly decoded image fragments at the detected overlap position.

Figure 23:
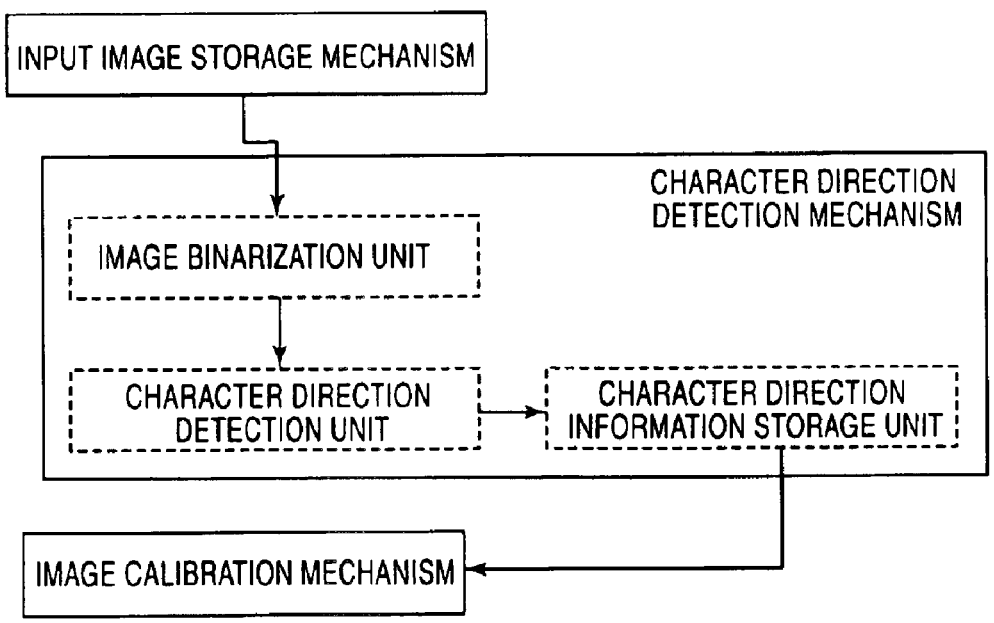
FIG. 23 is a diagram which shows a multivalent image character direction detection mechanism.
Figure 24:
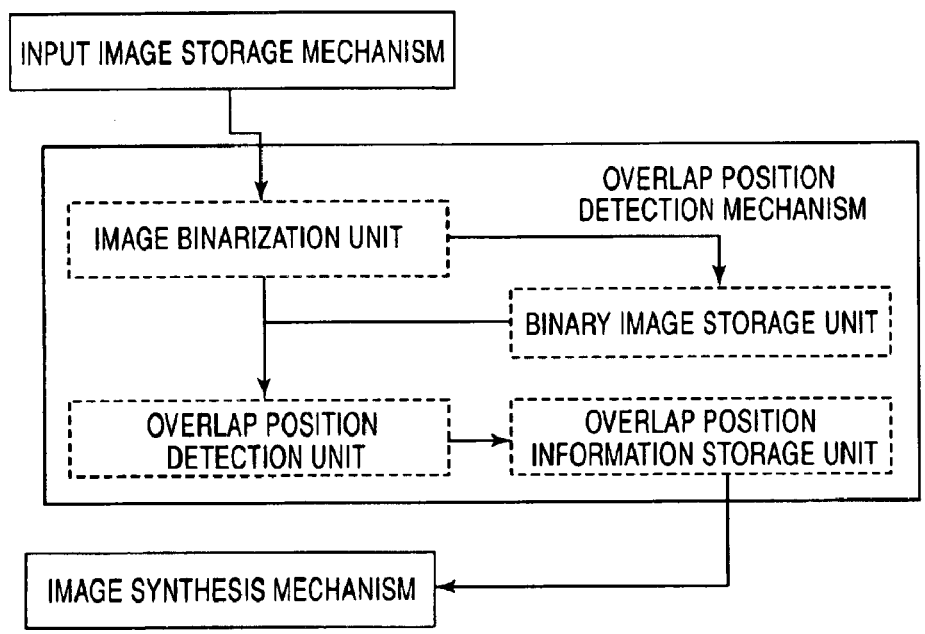
FIG. 24 is a diagram which shows a multivalent image overlap position detection mechanism.

FIGS. 23 and 24 respectively show the constitutions of a character direction detection mechanism and an overlap position detection mechanism when input image data based on the monochrome multivalent format and the color multivalent format are involved. In such a case, the character direction detection mechanism or overlap position detection mechanism possesses an image binarization unit for binarizing an input image. A binary image storage unit in which a binarized image is temporarily stored, furthermore, is configured on the overlap position detection mechanism. Their routines are otherwise identical to those of the character direction detection mechanism and overlap position detection mechanism shown respectively in FIGS. 21 and 22.

Since a binary image is used for the detection of the character direction or the detection of the overlap position in this method, a routine for binarizing the input image data is necessary. The pervasion of the character direction information alone upon the completion of the detection suffices in the case of the character direction detection, and therefore, the memory capacity requirement may be alleviated by deleting the binary image. In the case of the overlap position detection, two image fragments are necessary for detecting the overlap position of the respective images, and therefore, the binary image must also be stored until the second fragment is obtained. It is for this reason that a binary image storage unit is configured as its storage region. In this case, too, the pervasion of the overlap position information alone upon the completion of the detection suffices, and therefore, it is possible to delete the binary image. The memory capacity requirement may be alleviated by deleting the binary image.

Figure 25:
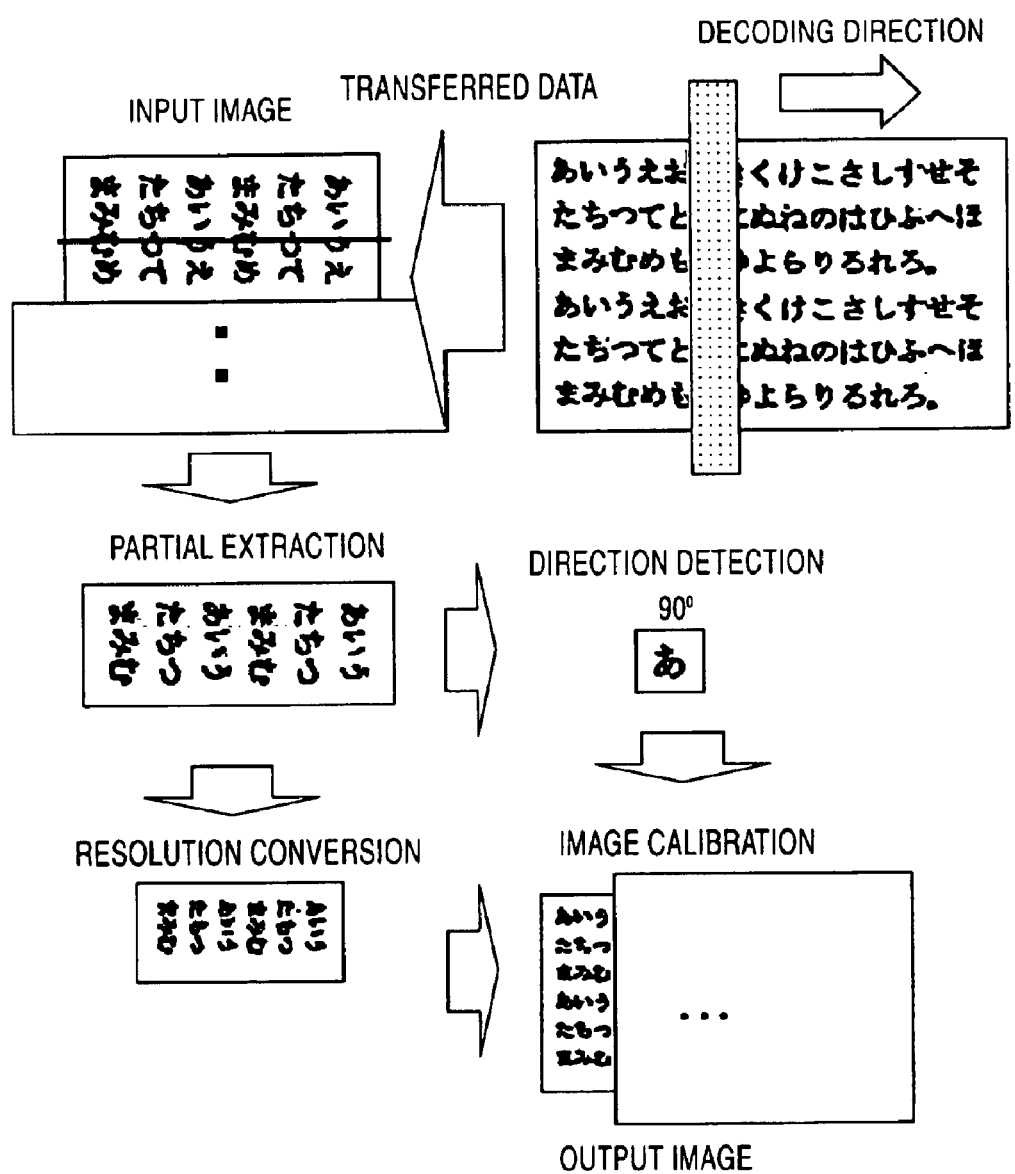
FIG. 25 is a diagram provided for explaining the image extraction, character direction detection, and calibration procedures.

FIG. 25 is a diagram provided for explaining the image input/extraction and character direction detection/image calibration routines which use an image scanner. As FIG. 25 indicates, when an original document is decoded by using a hand-held scanner, the image data are continuously accumulated within an input image memory (not shown in the figure) in accordance with the displacement of the scanner. There is no need to use the entire image information of the original for enabling the character direction detection and overlap position detection in this case, and only a portion of it is sufficient. For this reason, the image data which have been accumulated in the input image memory are partially extracted advantageously at a stage where a certain volume of image data has been accumulated, and the extracted image data are subjected to an appropriate routine (e.g., character direction detection, etc.). In the case of the resolution conversion routine, too, the image data which have been accumulated in the input image memory are partially extracted at a stage where a certain volume of image data has been accumulated, and the extracted image data are advantageously processed. In the cases of direction calibration and image synthesis routines, too, image data the resolutions of which have already been converted may be advantageously processed at stages where the direction and overlap position have respectively been detected successfully.

An image which is to become an image calibration object must be at least temporarily stored within a memory for enabling an image calibration routine, but in the case of a multivalent image, the volume of information becomes extremely large, and therefore it becomes necessary to select a high-capacity memory. It is possible, however, to alleviate the capacity requirement for the memory used for the character direction detection or position detection by partially extracting image data and adventitiously processing them prior to the completion of the accumulation of the entire input image data within the input image memory, or the processing speed may be upgraded instead. Similarly, the resolution conversion routine, image calibration routine, and the image synthesis routine can be executed at high speeds.

When the resolution of input image data and the resolution of an output image designated by a user are identical, the resolution conversion routine virtually becomes unnecessary, and therefore, the speed may be upgraded by eliminating this routine. Input image data, furthermore, can be used directly as images to be used for the image direction calibration routine and image synthesis routine, and therefore, the capacity requirement for the output image memory can be alleviated.

Figure 26:
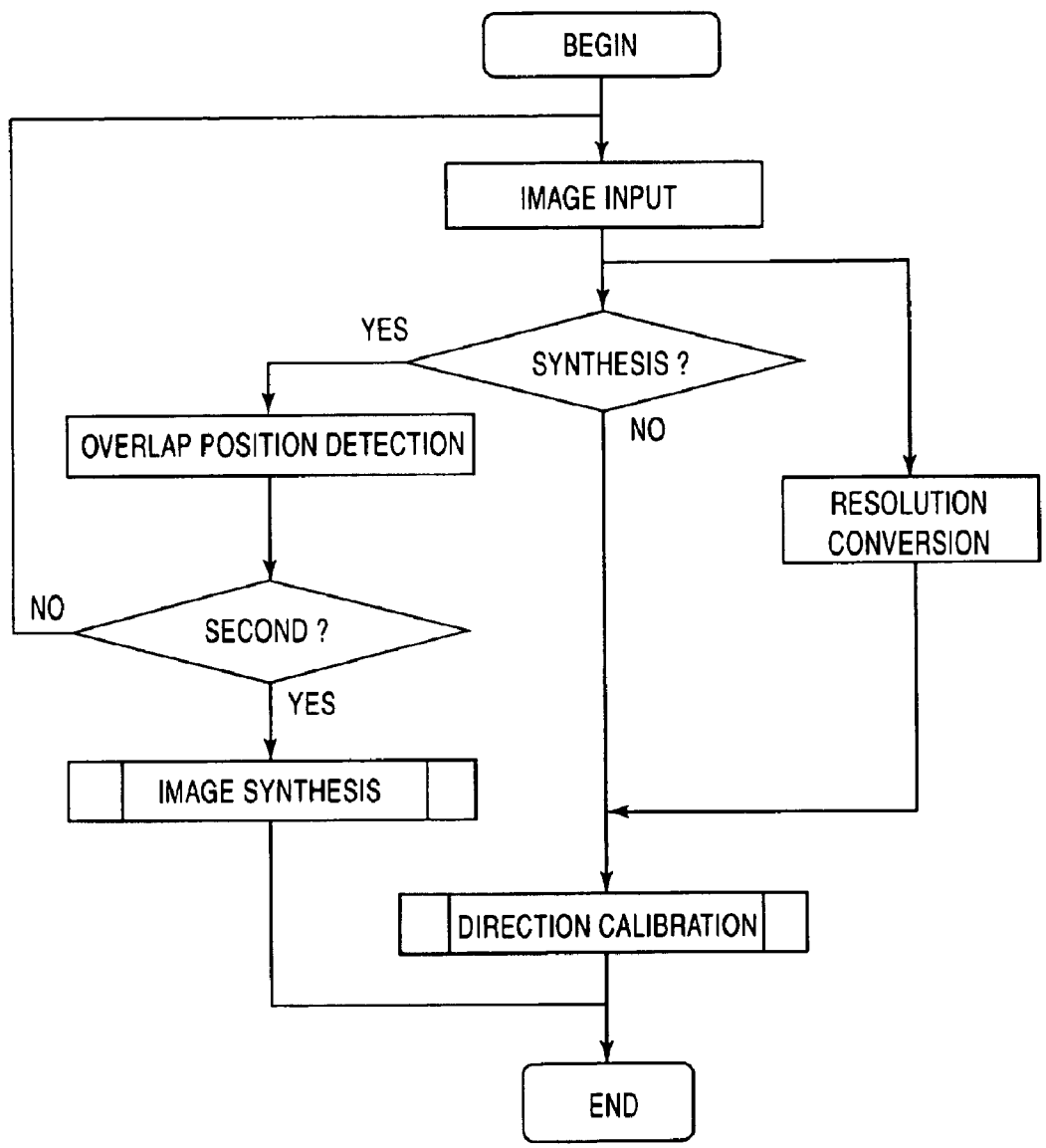
FIG. 26 is a flow chart provided for explaining the procedures of direction calibration and image synthesis routines.

FIG. 26 is a flow chart which shows the processing procedures of the aforementioned image processing device.

An input image which has been obtained from an image input machine (e.g., scanner, etc.) is first converted into an output image characterized by a resolution designated by a user by means of resolution conversion. When an image synthesis is unnecessary, the image direction is calibrated by using both the input image and output image. The direction calibration is carried out by detecting the image orientation based on the input image, and the direction of the output image is converted into the non-permutated one based on the detection results, followed by the generation of an eventual output image. When the image synthesis is necessary, on the other hand, the overlap positions of the respective input fragments must be detected. Two input image fragments are necessary for the overlap position detection and image synthesis, and when only one input image fragment has been obtained, the second input image fragment must be obtained. After the two input image fragments have been obtained, the overlap position of the two input image fragments is detected by the overlap position detection (mechanism). A singular final output image is generated in the image synthesis routine by synthesizing the two output image fragments of the resolution designated by the user corresponding to the input images used for the detection of the overlap position based on the obtained results.

Figure 27:
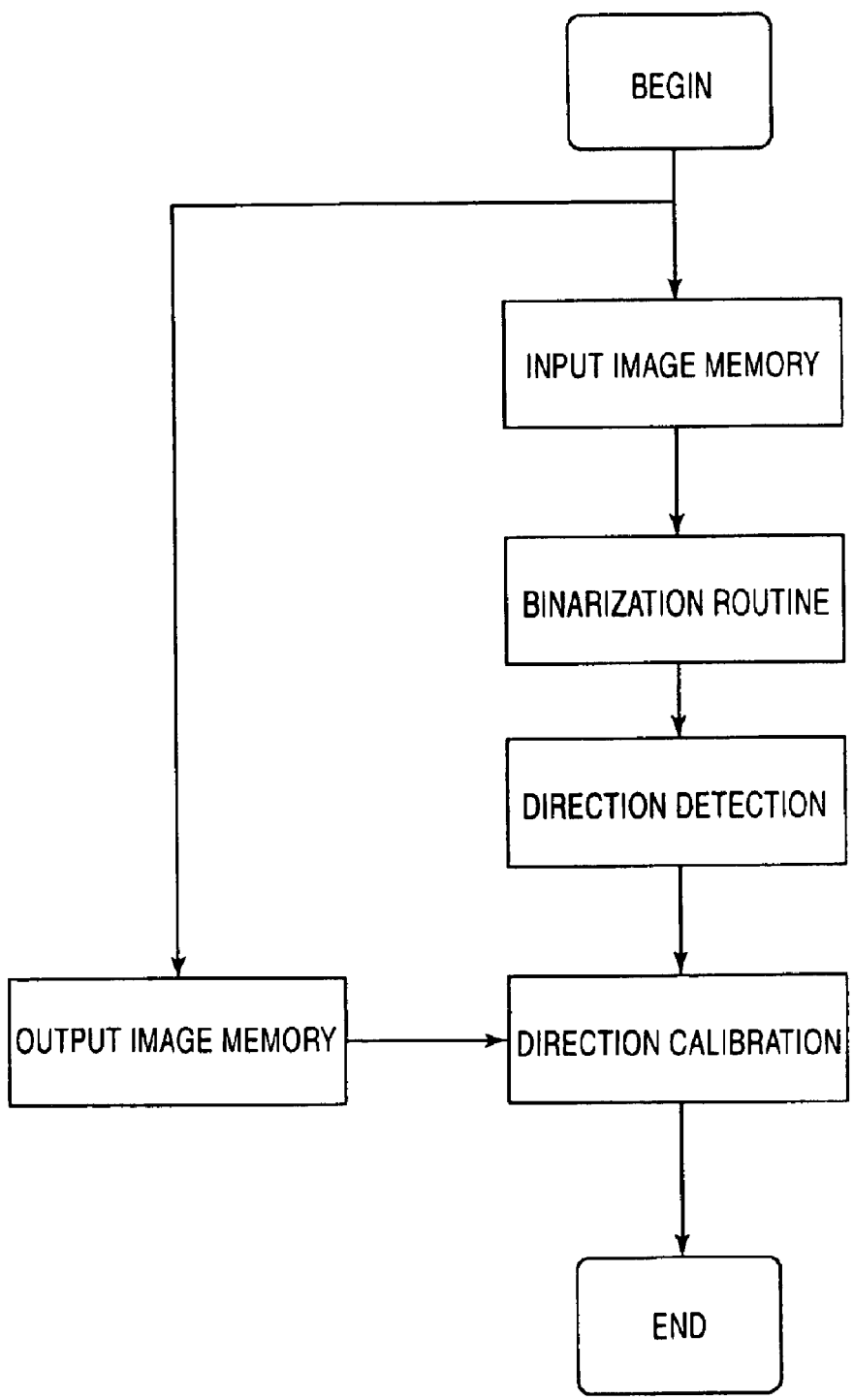
FIG. 27 is a flow chart which shows detailed direction calibration procedures.

FIG. 27 is a diagram which shows the flow of the direction calibration routine of the present invention. A case which involves an objective image based on the multivalent image data format will be hereby explained, but similar action procedures also apply to a case which involves an objective image based on the binary image data format.

An input image which has been obtained from a scanner, etc. is stored in an input image memory. A binarization routine is executed by retrieving the input image data which are being stored in the input image memory and by converting them into data based on the binary image data format. After the obtained binary image has been transferred to a direction detection unit, the image direction is detected. The binary image becomes unnecessary upon the completion of the direction detection, and therefore, it may be then deleted from the memory. An output image of the resolution designated by the user, on the other hand, is stored in the output image memory. A direction calibration routine is executed by retrieving the output image which is being stored in the output image memory, by converting it into a non-permutated image based on the direction detection results, and by outputting a final output image.

Figure 28:
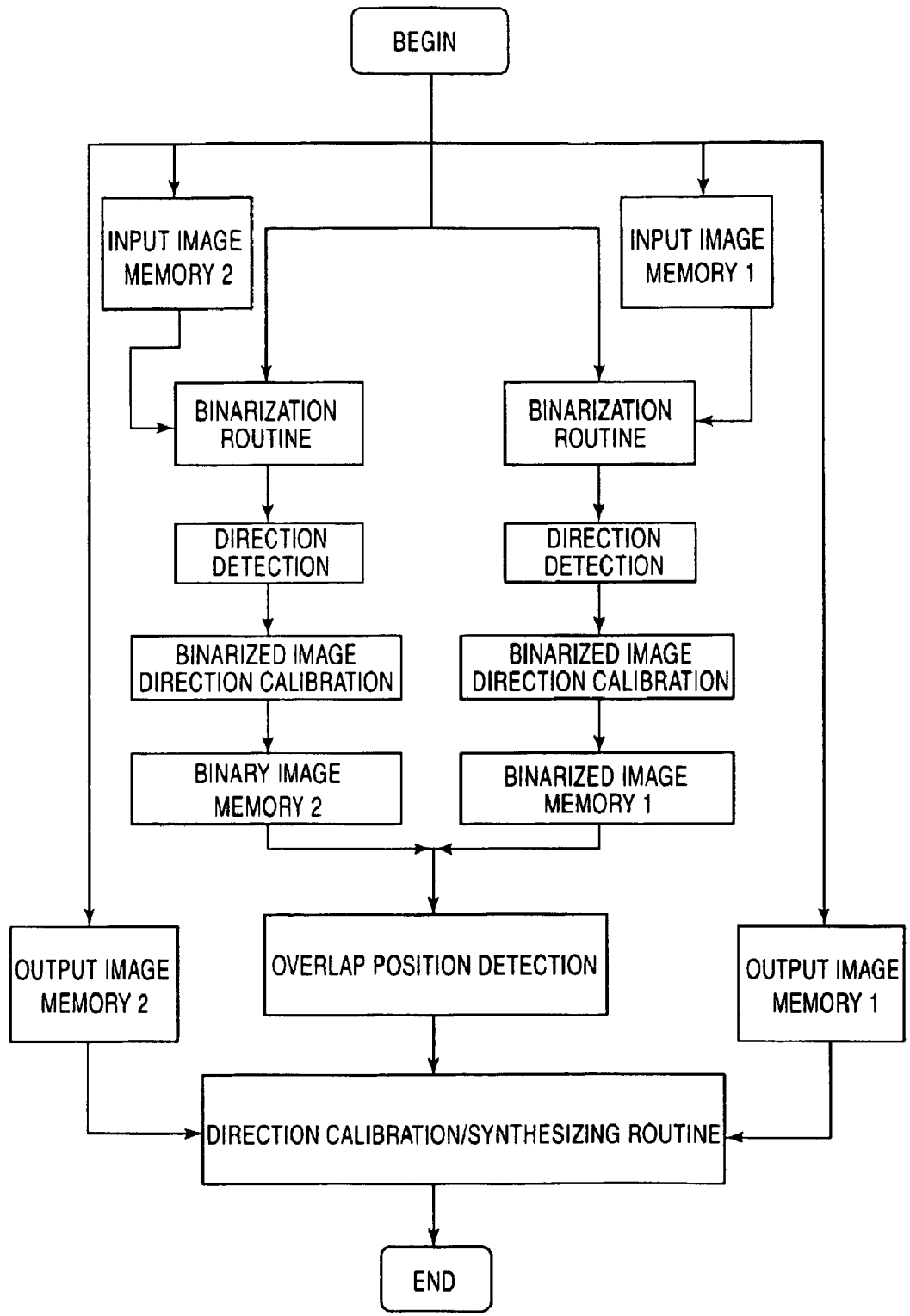
FIG. 28 is a flow chart which shows detailed image synthesis procedures.

FIG. 28 is a diagram Which shows the flow of a routine of the present invention for detecting the overlap position and for synthesizing an image. A case which involves an objective image based on the multivalent image data format will be hereby explained, but similar action procedures also apply to a case which involves an objective image based on the binary image data format.

A first image fragment is initially obtained. An input image which has been obtained from a scanner, etc. is stored in the input image memory (1). A binarization routine is executed by converting the image data which are being stored in the input memory (1) into data based on the binary image data format. After the obtained binary image has been transferred to a direction detection unit, the image direction is detected. The overlap position detection is contingent on the pervasion of a non-permutated objective binary image, and therefore, the binary image is converted into a non-permutated one based on the direction detection results during the binary image direction calibration routine, and the obtained image is stored in the binary image memory (1). An output image of the resolution designated by the user, on the other hand, is stored in the output image memory (1). The procurement of the first image fragment is thus completed.

A second image fragment is subsequently obtained. An input image which has been obtained from a scanner, etc. is stored in the input image memory (2). A binarization routine is executed by converting the image data which are being stored in the input memory (2) into data based on the binary image data format. After this binary image has been transferred to a direction detection unit, the image direction is detected. As in the case of the first fragment, the binary image is converted into a non-permutated one during a binary image direction calibration routine based on the direction detection results, and the obtained image is stored in the binary image memory (2). An output image of the resolution designated by the user, on the other hand, is stored in the output image memory (2). The procurement of the second image fragment is thus completed.

After the procurements of the two image fragments have been thus completed, the binary images which are being stored in the binary image memory (1) and binary image memory (2) are retrieved, and their respective overlap position is detection by an overlap position detection unit. After the respective output images which are being stored in the binary image memory (1) and binary image memory (2) have been directionally calibrated into non-permutated ones based on the direction detection results, they are synthesized based on the overlap position detection results, as a result of which a singular final output image is generated.

Figure 29:
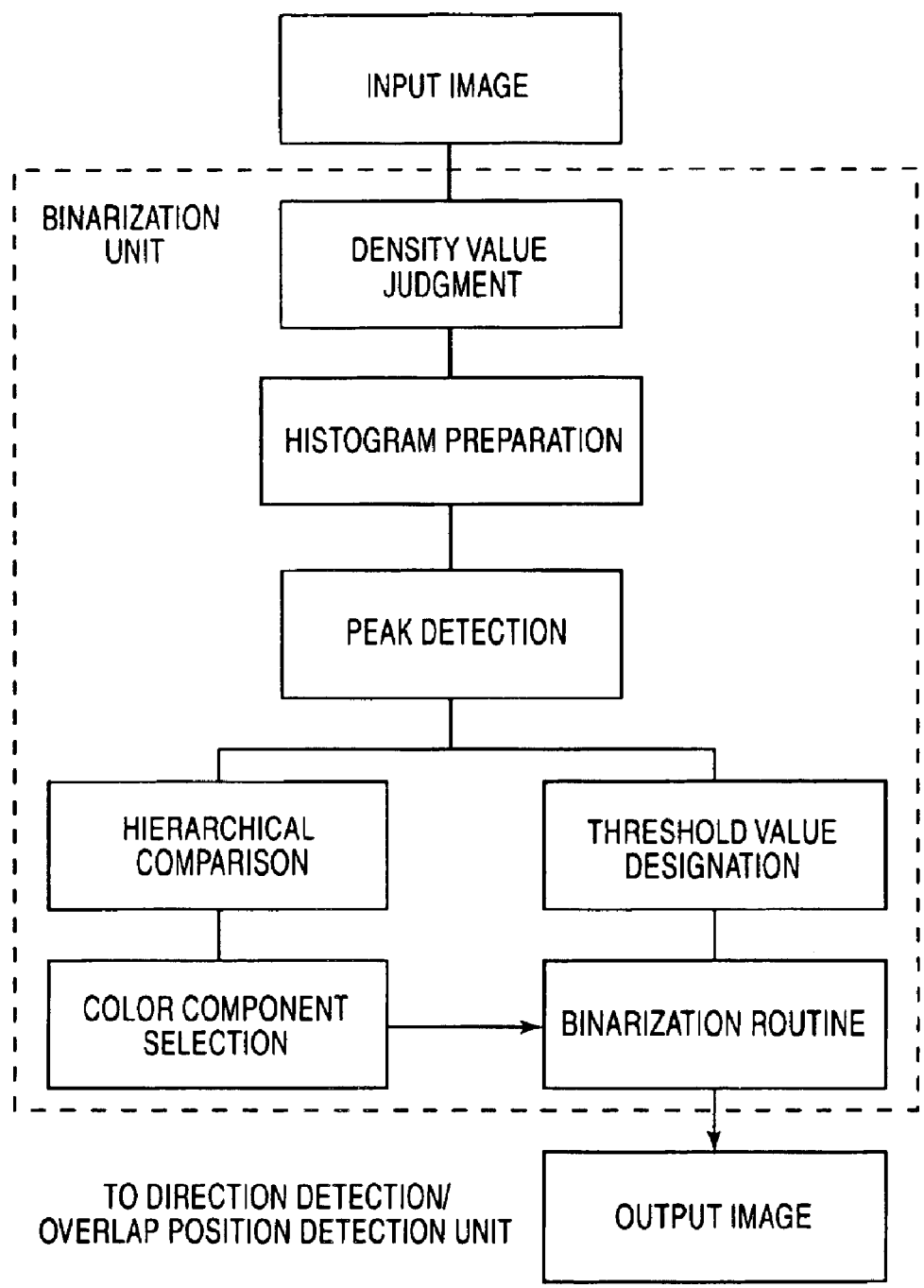
FIG. 29 is a diagram which shows the constitution of a binarization unit.

FIG. 29 is a diagram which shows a detailed view of a binarization unit which can be applied to any of the present application embodiments (e.g., routine of FIG. 1, etc.). The binarization unit possesses a histogram generation mechanism which generates a density value histogram with regard to each color component by tabulating inputted pixels in density value-specific fashions, a peak detection mechanism which detects a low-density-side peak value and a high-density peak-side value on said density histogram, a color component selection unit which compares the hierarchical relationship between the detected low-density-side peak value and high-density peak-side value with regard to each color component and which executes a binarization routine based on the comparison results, and a binarization unit which binarizes the color component image which has been selected by the color component selection unit. The actions of the respective units are identical to those discussed above, and therefore no detailed explanations will be provided.

The binarized image, furthermore, is transferred to the direction detection/overlap position detection unit (in the example of FIG. 1) as an output image.

What is claimed is:

1. An image processing method comprising the steps of:
   decoding an image by decomposing the image into multiple color components;
   drawing a histogram by calculating the density value frequencies of the image data on the respective color components which have been obtained as a result of decoding;
   calculating a high-density-side peak value and a low-density-side peak value from said histogram for judging their hierarchical relationship with regard to each of the respective color components;
   counting the number of colors selected from among said multiple color components whose high-density-side peak values are higher than their low-density-side peak values; and
   determining an image which is to become a binarization object based on the number of color components counted.

2. The image processing method according to claim 1, wherein
   the number of colors selected from among said multiple color components whose high-density-side peak values are higher and the number of colors selected from among said multiple color components whose low-density-side peak values are higher are compared, and
   the outnumbering color components are selected as images which are to become binarization objects.

3. The image processing method according to claim 1 or 2, wherein the respective pixels of the images of the respective color components which have been selected as binarization objects and preliminarily determined threshold levels are compared, and pixels of the respective color components which exceed said threshold levels are judged to be either black or white, whereas the other pixels are judged to be the other.

4. The image processing method according to claim 1, wherein when the number of color components whose low-density-side peak values are higher exceeds the number of color components whose high-density-side peak values are higher, said color components whose low-density-side peak values are higher are selected as binarization object images, and during a binarization routine the white pixels and black pixels of said images are permutated.

5. An image processing device comprising:
   in an image processing device which processes image data which have been decoded after having been decomposed into multiple color components;
   a histogram generation mechanism which generates a density value histogram with regard to each color component by tabulating inputted pixels in density value-specific fashions;
   a peak detection mechanism which detects a low-density-side peak value and a high-density-side peak value on said density histogram;
   a color component selection unit which compares the hierarchical relationship between said detected low-density-side peak value and high-density peak-side value with regard to each color component and which executes a selection routine based on the comparison results; and
   a binarization unit which binarizes the color component image which has been selected by said color component selection unit.

6. The image processing device according to claim 5 further comprises:
   a threshold value designation mechanism which designates a binarization threshold value based on the low-density-side and high-density-side peak values which have been detected by said peak detection mechanism is additionally configured.

7. The image processing device according to claim 5 or 6 wherein:
   said color component selection unit counts the number of color components whose low-density-side peak values are higher and the number of color components whose high-density-side peak values are higher, and
   said binarization unit judges that, when the number of color components whose high-density-side peak values are higher is larger, the pixels which exceed a threshold value with regard to said color components are either white or black, whereas when the number of color components whose low-density-side peak values are higher is larger, the pixels which exceed said threshold value with regard to said color components are the other.

* * * * *